United States Patent
Day

(10) Patent No.: US 11,651,456 B1
(45) Date of Patent: *May 16, 2023

(54) RENTAL PROPERTY MONITORING SOLUTION USING COMPUTER VISION AND AUDIO ANALYTICS TO DETECT PARTIES AND PETS WHILE PRESERVING RENTER PRIVACY

(71) Applicant: Ambarella International LP, Santa Clara, CA (US)

(72) Inventor: Christopher N. Day, Los Gatos, CA (US)

(73) Assignee: Ambarella International LP, Santa Clara, CA (US)

(*) Notice: Subject to any disclaimer, the term of this patent is extended or adjusted under 35 U.S.C. 154(b) by 370 days.

This patent is subject to a terminal disclaimer.

(21) Appl. No.: 16/858,230

(22) Filed: Apr. 24, 2020

Related U.S. Application Data

(60) Provisional application No. 62/949,049, filed on Dec. 17, 2019.

(51) Int. Cl.
| | |
|---|---|
| *G06V 20/40* | (2022.01) |
| *G06Q 50/16* | (2012.01) |
| *G06N 3/08* | (2023.01) |
| *G06K 9/62* | (2022.01) |
| *H04M 1/72454* | (2021.01) |
| *G06V 10/426* | (2022.01) |

(52) U.S. Cl.
CPC ......... *G06Q 50/163* (2013.01); *G06K 9/6262* (2013.01); *G06N 3/08* (2013.01); *G06V 10/426* (2022.01); *G06V 20/40* (2022.01); *H04M 1/72454* (2021.01)

(58) Field of Classification Search
CPC ............ G06Q 50/163; H04M 1/72454; G06V 10/426; G06V 10/776; G06V 10/778; G06V 30/1916; G06V 30/19167; G06V 30/302; G06N 3/08
See application file for complete search history.

(56) References Cited

U.S. PATENT DOCUMENTS

| | | | |
|---|---|---|---|
| 9,842,373 B2* | 12/2017 | Ahroon | G06Q 30/0645 |
| 10,453,149 B1* | 10/2019 | Gaudin | G06Q 30/0645 |
| 2013/0063472 A1* | 3/2013 | Marison | G06T 15/005 |
| | | | 345/591 |
| 2013/0218609 A1* | 8/2013 | Colletti | G06Q 30/0282 |
| | | | 705/5 |
| 2018/0005143 A1* | 1/2018 | Camargo | H04W 12/06 |
| 2019/0371145 A1* | 12/2019 | McQueen | H04L 63/162 |
| 2020/0027337 A1* | 1/2020 | Cruz Huertas | G08B 27/003 |
| 2020/0341457 A1* | 10/2020 | Prugh | G01L 1/242 |
| 2020/0410337 A1* | 12/2020 | Huang | G06N 3/04 |

* cited by examiner

*Primary Examiner* — Syed Haider
(74) *Attorney, Agent, or Firm* — Christopher P. Maiorana, PC

(57) ABSTRACT

An apparatus including a capture device and a processor. The capture device may be configured to generate pixel data of a location. The processor may be configured to generate video frames from said pixel data, perform video operations to detect objects in the video frames, extract data about the objects based on characteristics of the objects determined using the video operations, compare the data to a list of restrictions for the location and generate a notification in response to the data matching an entry of the list of restrictions. The video frames may be discarded after performing the video operations. The video operations may be performed locally by the processor.

20 Claims, 13 Drawing Sheets

RENTAL PROPERTY MONITORING SOLUTION USING COMPUTER VISION AND AUDIO ANALYTICS TO DETECT PARTIES AND PETS WHILE PRESERVING RENTER PRIVACY

FIELD OF THE INVENTION

The invention relates to security cameras generally and, more particularly, to a method and/or apparatus for implementing a rental property monitoring solution using computer vision and audio analytics to detect parties and pets while preserving renter privacy.

BACKGROUND

With the popularity of services like AirBNB, renting property is becoming increasingly popular and has less oversight. Rentals can be set up without the property owner and the renter(s) ever meeting in person. Property owners face the problem of how to protect themselves against renters holding unauthorized parties at rental properties. In addition to online rental services, property owners in areas that have colleges or universities have long had problems with renters involving large parties, loud noises, drugs and alcohol (i.e., keg parties). Additionally, some property owners want to protect themselves against renters bringing pets to the property. Large parties and renters not using a rental property as intended can result in damage to the property, liability issues for the property owner and/or late night angry calls from neighbors.

Property owners cannot always be physically present to watch the rental property. The use of existing video cameras to monitor properties to check on the compliance of renters is problematic because of privacy issues. Renters do not want video of themselves being viewed remotely, voice conversations being listened to, or any recordings, video or audio, being made.

It would be desirable to implement a rental property monitoring solution using computer vision and audio analytics to detect parties and pets while preserving renter privacy.

SUMMARY

The invention concerns an apparatus comprising a capture device and a processor. The capture device may be configured to generate pixel data of a location. The processor may be configured to generate video frames from said pixel data, perform video operations to detect objects in the video frames, extract data about the objects based on characteristics of the objects determined using the video operations, compare the data to a list of restrictions for the location and generate a notification in response to the data matching an entry of the list of restrictions. The video frames may be discarded after performing the video operations. The video operations may be performed locally by the processor.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a rental property monitoring solution using computer vision and audio analytics to detect parties and pets while preserving renter privacy that may (i) perform video analytics locally, (ii) perform audio analytics locally, (iii) discard data after processing, (iv) perform video analytics without storing video data, (v) detect restricted activities, (vi) count a number of people at a location, (vii) detect an audio level at a location, (viii) provide a notification when a restricted activity is detected, (ix) protect privacy of people in video data by not making video frames available to communicate, and/or (x) be implemented as one or more integrated circuits.

Embodiments of the present invention may be configured to monitor a location (e.g., a property) and notify a property owner in the event of a restricted activity being detected. In an example, the restricted activity may be a party being held and/or the presence of a pet. Using camera technology and/or computer vision, data (e.g., parameters and statistics) may be extracted from captured images and/or sound. The data may be used to make decisions. The decisions may be determined based on the video data and/or the audio data. However, the video data and/or the audio data may not need to be stored and/or communicated. For example, after the decision has been determined, the video data and/or the audio data may be discarded. Discarding the video data and/or the audio data may preserve privacy.

The detection of restricted activities may be determined based on various search parameters performed using computer vision and/or audio analytics. In one example, whether a party is detected may be determined based on using computer vision to detect people and counting the number of people present at the location. In another example, analytics may be implemented to detect a sound level at the location (e.g., detect whether loud music is being played). The computer vision operations may be configured to detect and/or classify objects. In an example, the computer vision operations may be configured to detect animals.

Embodiments of the present invention may be configured to provide a notification to the property owner. The notification may comprise a warning notice. The warning notice may indicate that a restricted activity has been detected. In an example, the notification may be presented from a cloud service to a user device such as a smart phone. The cloud service may be configured to receive the decisions made by the invention, but may not receive the video data and/or the audio data.

Figure 1:
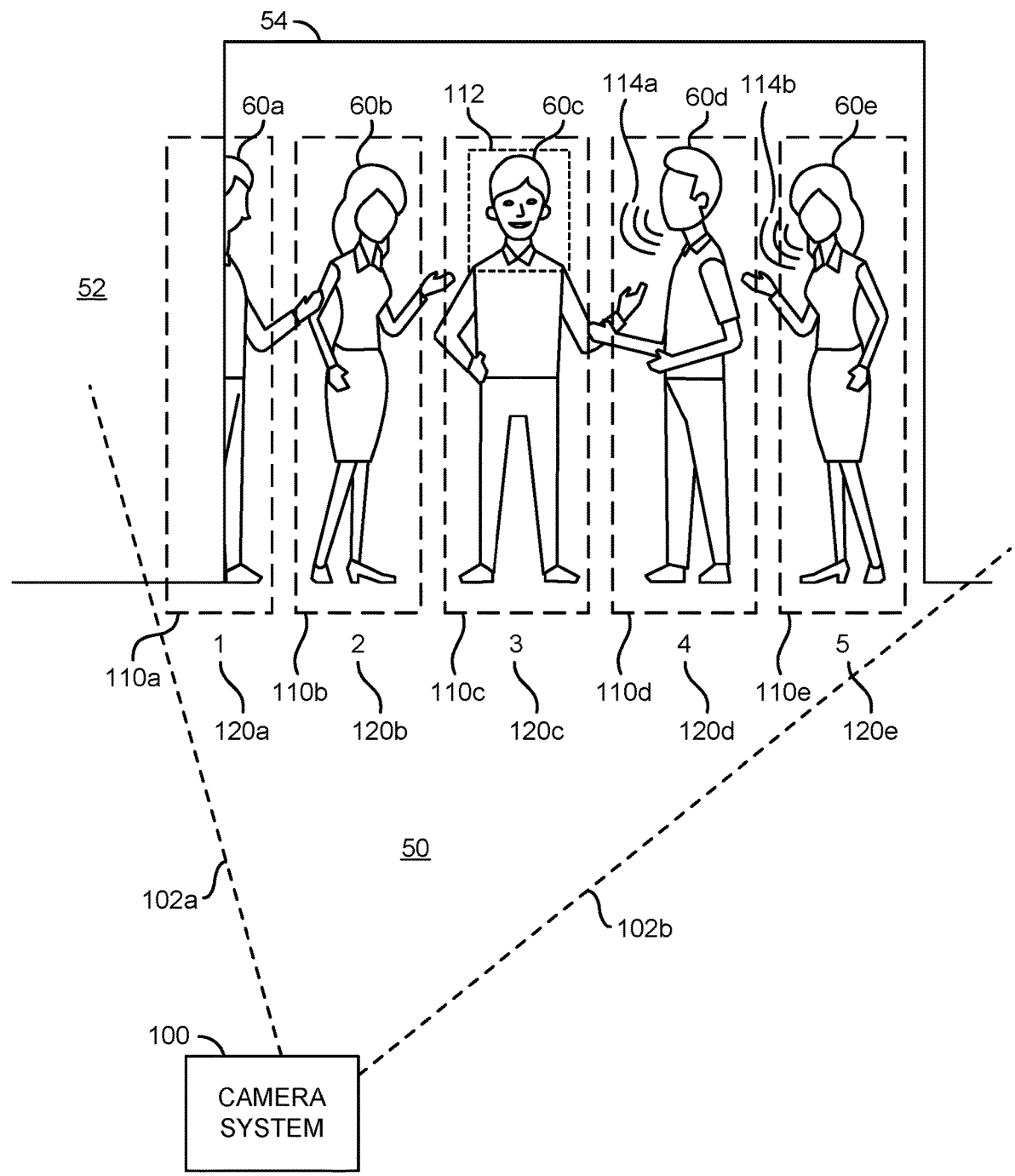
FIG. 1 is a diagram illustrating an example embodiment of the present invention.

Referring to FIG. 1, a diagram illustrating an example embodiment of the present invention is shown. An example location 50 is shown. In an example, the location 50 may be a rental property. In the example shown, the location 50 may be an interior location. In another example, the location 50 may be an outdoor location. In yet another example, the location 50 may be a combination of an indoor and outdoor location comprising multiple rooms of a building and/or multiple floors of a building. The type of location 50 may be varied according to the design criteria of a particular implementation.

In the example shown, the location 50 may comprise an interior wall 52. An opening 54 is shown in the wall 52 (e.g., a doorway to another room). A number of people 60a-60e are shown. The person 60a is shown partially obscured by the wall 52. The people 60b-60e may be visible in the opening 54.

An apparatus (or block, or circuit, or device) 100 is shown. The apparatus 100 may be configured to implement an embodiment of the present invention. The apparatus 100 may implement a camera system. The camera system 100 may be configured to capture video data, capture audio data, perform computer vision operations and/or perform audio analytics. In an example, the camera system 100 may be configured to implement a rental property monitoring system using computer vision and audio analytics to detect parties and pets while preserving renter privacy.

Lines 102a-102b are shown. The lines 102a-102b may represent a field of view of the camera system 100. The camera system 100 may capture video frames of the area within the field of view 102a-102b. In the example shown, the lines 102a-102b may provide an illustrative example of the field of view of the camera system 100. In some embodiments, the camera system 100 may comprise one single 360-degree camera (e.g., capturing a 360-degree field of view). In some embodiments, the camera system 100 may comprise two back-to-back 180-degree cameras for capturing two 180-degree fields of view (e.g., in front and behind the camera system 100). In some embodiments, the camera system 100 may implement a fisheye lens providing a wide-angle field of view. The types of lenses used and/or the field of view captured by the camera system 100 may be varied according to the design criteria of a particular implementation.

In the example location 50, the people 60a-60e may be within the field of view 102a-102b of the camera system 100. In the example shown, the people 60a-60e may be visible in video frames captured by the camera system 100. Dotted boxes 110a-110e are shown. The dotted boxes 110a-110e may represent objects detected by the camera system 100. The dotted boxes 110a-110e are shown around the people 60a-60e. In the example shown, the camera system 100 may be configured to detect the people 60a-60e as the objects 110a-110e. While the people 60a-60e are shown as the detected objects 110a-110e in the example shown in association with FIG. 1, the detected objects 110a-110e may be animals and/or inanimate objects (e.g., furniture, electronics, structures, etc.). While five people 60a-60e are shown as the detected objects 110a-110e, the camera system 100 may be configured to detect any number of objects (e.g., detect the people 60a-60n as the objects 110a-110n). The number and/or types of objects 110a-110n detected by the camera system 100 may be varied according to the design criteria of a particular implementation.

A dotted box 112 is shown around the head of the person 60c. The dotted box 112 may represent the camera system 100 detecting characteristics of the object 110c. While the characteristics 112 are shown corresponding to the object 110c, the camera system 100 may be configured to detect the characteristics of each of the objects 110a-110n. The camera system 100 may be configured to analyze the characteristics 112 of the objects 110a-110n to determine what the objects 110a-110n are (e.g., classification), determine what the objects 110a-110n are doing (e.g., behavior analysis) and/or to distinguish one object from another object. The types of characteristics 112 detected and/or analyzed and/or the inferences made based on detecting the characteristics 112 may be varied according to the design criteria of a particular implementation.

The characteristics 112 may comprise descriptive and/or identifying attributes of the objects 110a-110n. In one example, the characteristics 112 may comprise clothing worn (e.g., style of clothing, a color of the clothing, the color of the pants, whether pants or shorts are worn, brand of pants worn, etc.). The characteristics 112 may comprise physical characteristics about the detected objects 110a-110n. In an example, the characteristics 112 may comprise a height, estimated weight, body type, hair color, skin color, gait, etc. The types of characteristics 112 detected may be used to distinguish one of the people 60a-60n from another of the people 60a-60n (e.g., to ensure that the number of people are counted without double-counting a person). The types of the characteristics 112 detected may be varied according to the design criteria of a particular implementation.

Waves 114a-114b are shown. The waves 114a-114b may represent audio detected by the camera system 100. In the example shown, the waves 114a-114b may represent people talking. For example, the waves 114a may be an illustrative representation of the person 60d talking and the waves 114b may be an illustrative representation of the person 60e talking. The camera system 100 may be configured to determine an audio level (e.g., amplitude) of the audio 114a-114b. In the example shown, the audio 114a-114b may be generated from the people 60a-60e. The camera system 100 may be configured to determine an audio level of the location 50. The audio level may comprise audio from the people 60a-60e (e.g., talking), televisions, music devices, objects breaking, etc. The type of audio detected may be varied according to the design criteria of a particular implementation.

The computer vision operations performed by the camera system 100 may be configured to extract data from the video frames and/or the audio captured. The extracted data may comprise parameters and/or statistics about the content of the video frames and/or audio captured. Extracted data 120a-120e is shown. In the example shown, the extracted data 120a-120e may represent a person count corresponding to the people 60a-60e in the location 50. The extracted data 120a-120e may be used by the camera system 100 to make decisions. In one example, the decisions made by the camera system 100 based on the extracted data 120a-120e may comprise determining whether terms of a rental agreement have been breached. After the extracted data 120a-120e has been generated from the video frames and/or the audio captured, the camera system 100 may discard the video frames and/or the audio captured (e.g., additional information from the video frames and/or the audio captured may be needed to make decisions).

In some embodiments, the computer vision operations performed by the camera system 100 may be configured to count a number of people at the location 50. In the example shown, numbers 1-5 (e.g., the extracted data 120a-120e) are shown below a corresponding one of the detected objects 110a-110e. The camera system 100 may be configured to distinguish between the detected objects 110a-110n based on the characteristics 112 of each of the detected objects 110a-110n. For example, the camera system 100 may be configured to determine that the person 60b is one person and the person 60c is another person. In another example, the characteristics 112 may be used to prevent the people 60a-60e from being counted multiple times (e.g., distinguishing a reflection of a person from the actual person).

In the example shown, the person 60a is shown partially obscured behind the wall 52. The camera system 100 may be configured to determine that the characteristics 112 of the visible portion of the person 60a corresponds to one person. For example, the camera system 100 may be configured to infer that a person has been detected based on a partial view. In the example shown, the hand of the person 60d is shown in front of the arm of the person 60c. The camera system 100 may be configured to determine that more than one person is present when one person is partially in front of another person.

In some embodiments, the camera system 100 may be configured to determine a behavior of the objects 110a-110n. Inferences may be made about the behavior of the objects 110a-110n based on the characteristics 112 detected. In an example, a person that is standing still and using arm gestures may be determined to be talking. In another example, regular or rhythmic body movement may be determined to be dancing. The body movement may be compared to the audio data (e.g., music) to determine whether the behavior indicates dancing. In one example, the camera system 100 may make an inference that there is a party at the location 50 based on the people 60a-60n dancing. In yet another example, the characteristics 112 may indicate that the people 60a-60n are holding drinks, which may indicate alcohol is being consumed at the location 50. For example, optical character recognition (OCR) may be implemented to read labels (e.g., to detect beer, liquor, wine, etc.).

In the example shown, the characteristics 112 may correspond to a face of the person 60c (e.g., the detected object 110c). The characteristics 112 may be determined for each of the detected objects 110a-110e (e.g., the people 60a-60e, items held by the people 60a-60e, other items in the location 50, etc.). The characteristics 112 may comprise a color of the detected objects 110a-110e (e.g., color of clothing worn). The characteristics 112 may comprise the size of objects (e.g., a height of a person). The characteristics 112 may comprise a classification of the detected objects 110a-110e (e.g., recognizing the people 60a-60e as distinct people, identifying an item as a television, recognizing an animal, etc.). In some embodiments, the characteristics 112 may be used by the camera system 100 to distinguish between the detected objects 110a-110e.

Figure 2:
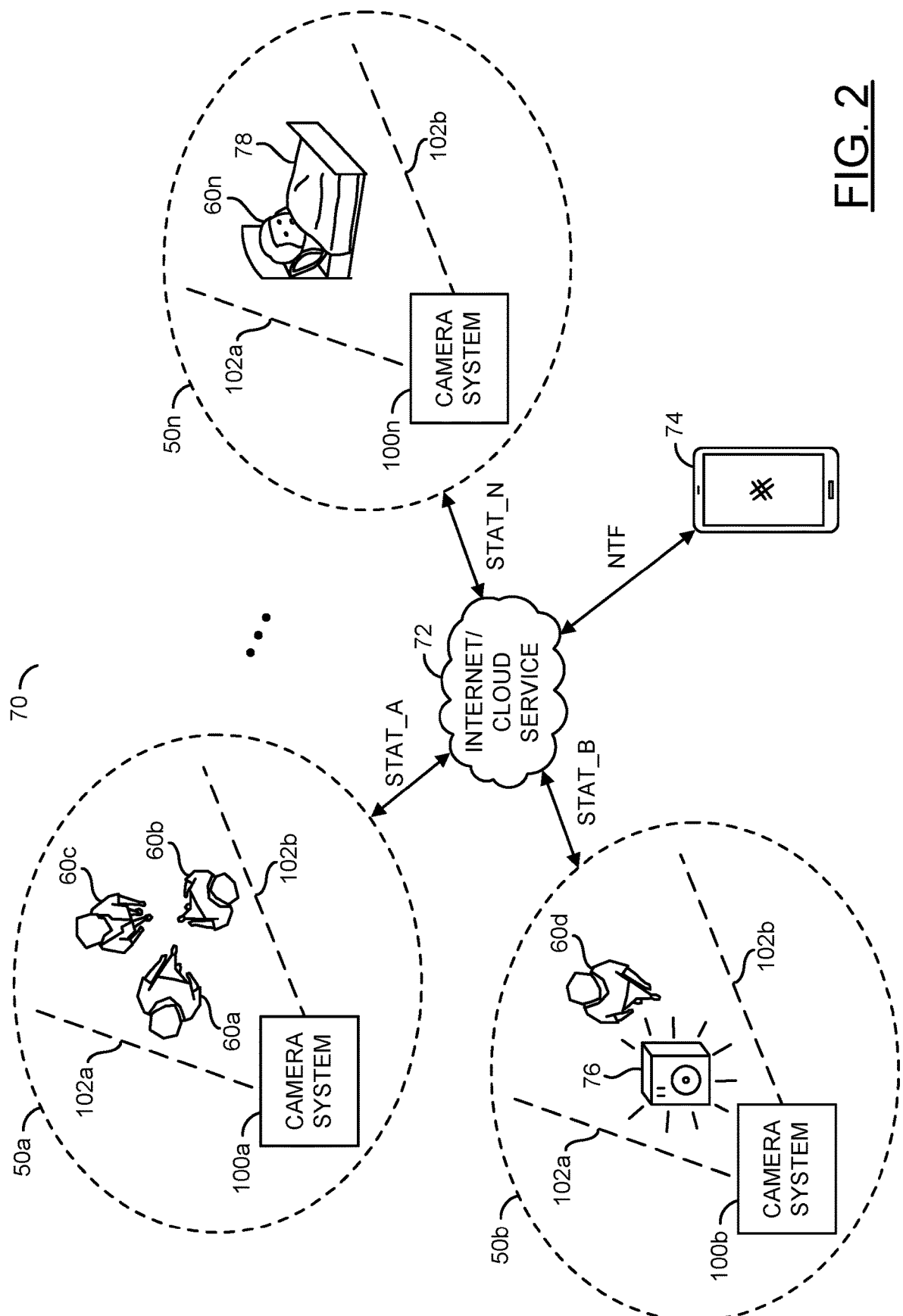
FIG. 2 is a diagram illustrating monitoring rental properties using computer vision and/or audio analytics.

Referring to FIG. 2, a diagram illustrating monitoring rental properties using computer vision and/or audio analytics is shown. An example scenario 70 is shown. The example scenario 70 may comprise a number of locations 50a-50n, a network/cloud service 72 and/or a remote device 74. In some embodiments, the locations 50a-50n may be remote locations (e.g., different geographic locations such as different cities, different countries, different areas within the same city, etc.). In some embodiments, the locations 50a-50n may be different locations within the same building (e.g., different rooms of a rental property, an interior and an exterior of a rental property, etc.). Each of the locations 50a-50n are shown implementing a respective camera system 100 (e.g., the camera systems 100a-100n). For example, each of the camera systems 100a-100n may be configured to operate independently of each other (e.g., video data and/or audio data may not be shared). However, the parameters and statistics generated by the camera systems 100a-100n may be shared. Generally, each of the camera systems 100a-100n may be configured to monitor the respective locations 50a-50n similar to the camera system 100 monitoring the location 50 described in association with FIG. 1.

The network 72 may be a wide area network (e.g., the internet) and/or a local area network. The network 72 may enable communication between the camera systems 100a-100n and/or the remote device 74. The network 72 may implement wired communication, wireless communication and/or a combination of wired communication and wireless communication. The network 72 may comprise a number of server computers. The network 72 may be configured to store data, retrieve and transmit stored data, process data and/or communicate with other devices.

The network 72 may be implemented as part of a cloud computing platform (e.g., distributed computing). In an example, the network 72 may be implemented as a group of cloud-based, scalable server computers. By implementing a number of scalable servers, additional resources (e.g., power, processing capability, memory, etc.) may be available to process and/or store variable amounts of data. For example, the network 72 may be configured to scale (e.g., provision resources) based on demand. The network 72 may implement scalable computing (e.g., cloud computing). The scalable computing may be available as a service to allow access to processing and/or storage resources without having to build infrastructure. In some embodiments, the network 72 may be configured to provide resources such as training data and/or a database of feature maps (e.g., feature maps of recognized objects to perform object recognition and/or classification). For example, the training data and/or feature maps may be communicated to the camera systems 100a-100n by the network 72 based on the contents of a rental agreement.

In the example shown, the remote device 74 may be implemented as a smartphone. In another example, the remote device 74 may be implemented as a tablet computing device, a desktop computer, a phablet, a wearable headset, a patient monitor, etc. Generally, the remote device 74 may comprise a display, a speaker, a microphone and/or a user input device. In the example shown, one remote device 74 is shown. However, the example scenario 70 may be implemented having multiple remote devices (e.g., remote devices 74a-74n, not shown). In an example, the smartphone 74a may be used by the landlord and the smartphone 74b may be used by the renter.

The remote device 74 may be configured to receive notifications from the camera systems 100a-100n. The camera systems 100a-100n may not communicate the video data and/or the audio data. For example, the camera systems 100a-100n may discard video data and/or audio data after performing the analysis. Discarding the video data and/or audio data may ensure the privacy of the people 60a-60n. The notification may provide information that corresponds to the determinations made by the camera systems 100a-100n in response to performing the analysis of the video data and/or audio data (e.g., based on the statistic and parameters).

In the example shown, the remote device 74 is shown at a location other than the locations 50a-50n. For example, the notification may provide the rental property owner information about the locations 50a-50n from a remote geographic location. In some embodiments, the remote device 74 may be located at or near one of the locations 50a-50n. For example, to further protect privacy of the people 60a-60n, the information about the analysis performed by the camera systems 100a-100n may be stored on-site at the locations 50a-50n and the rental property owner may access the information on-site.

The locations 50a-50n may each comprise a respective one of the camera systems 100a-100n. Each of the camera systems 100a-100n are shown having the field of view 102a-102b. In the example shown, the locations 50a-50n may be the subject of the monitoring.

The rental property owner may provide the people 60a-60n with a rental agreement. The rental agreement may comprise a list of restrictions. The restrictions may comprise various entries that may comprise a number of people, disallowed animals, noise levels and/or behaviors. The camera systems 100a-100n may be configured to perform the analysis of the video data and/or the audio data to determine whether the data detected matches any entries on the list of restrictions. For example, the list of restrictions may be converted to parameters that may be used by the computer vision operations and/or the audio analytics to perform the detection. If the data detected by the camera systems 100a-100n matches any of the entries on the list of restrictions, the camera system 100 may generate a notification. The notification may be a warning to the people 60a-60n to cure the cause of the warning. The notification may be provided to the rental property owner.

Status signals (e.g., STAT_A-STAT_N) are shown presented to the network 72. The status signals STAT_A-STAT_N may be generated by the camera systems 100a-100n. The status signals STAT_A-STAT_N may represent the notifications generated by the camera systems 100a-100n. In some embodiments, the status signals STAT_A-STAT_N may provide continual updates (e.g., provided even if the camera system 100a-100n does not detect any of the entries of the list of restrictions). For example, the signals STAT_A-STAT_N may provide continual updates about the extracted data 120a-120e (e.g., the number of the people 60a-60n at the rental property) generated by the camera systems 100a-100n.

In the example shown, the signals STAT_A-STAT_N are shown communicated from the camera systems 100a-100n to the network 72. In some embodiments, the signals STAT_A-STAT_N may be shared between the camera systems 100a-100n. For example, the breach of the rental agreement may be based on a total number of people detected. If the locations 50a-50n are multiple rooms in a single rental property, one of the cameras 100a-100n alone may not be capable of counting all the people at once. By sharing the parameters and statistics in the signals STAT_A-STAT_N, the cameras 100a-100n may determine the total number of people.

A signal (e.g., NTF) is shown. The signal NTF may be presented to the remote device 74 in response to one or more of the status signals STAT_A-STAT_N. The signal NTF may be provided in a format readable by the remote device 74. For example, an application may be provided for the rental property owner to use on the remote device 74 and the application may be compatible with an API of the network 72 and/or the camera systems 100a-100n.

In the example shown, the notification signal NTF is shown provided by the network 72 to the remote device 74. In some embodiments, the camera systems 100a-100n may be configured to generate the notification locally. For example, the camera systems 100a-100n may comprise a speaker configured to provide an audio warning to the renters when a breach has been detected (e.g., "The terms of the rental agreement have been breached. Ten people have been detected and only 4 are allowed. Please ask 6 people to leave.").

In the location 50a, three of the people 60a-60c are shown. The camera system 100a may be configured to count the number of people at the location 50a using the computer vision operations. The computer vision operations performed by the camera system 100a may detect three people. The example shown in association with the location 50a may represent detecting more people than are allowed by the list of restrictions. For example, the rental agreement may provide a restriction of two people. In an example, when three people are detected by the camera system 100a, the camera system 100a may generate the signal STAT_A. In another example, the camera system 100a may provide regular updates about the number of people using the signal STAT_A (e.g., the camera system 100a may indicate that two people are at the location 50a, then update at regular intervals and when the third person arrives the number of people will be updated). The signal NTF may be presented by the network 72 to the remote device 74 in response to the signal STAT_A. In an example, the notification may indicate that the entry on the list of restrictions for number of people has been violated.

In the location 50b, the person 60d and a speaker 76 are shown. The camera system 100b may be configured to count the number of people at the location 50a using the computer vision operations. In an example, the computer vision operations performed by the camera system 100b may detect one person, which may be in compliance with the list of restrictions. The example shown in association with the location 50b may represent detecting a higher audio level than is allowed by the list of restrictions. For example, the rental agreement may provide a restriction on noise level. In the example shown, the speaker 76 may be set to eleven (e.g., too loud compared to the noise level threshold from the list of restrictions). The camera system 100b may perform the analysis of the audio from the speaker 76 and determine whether the amplitude of the audio detected matches (or is greater than) the audio level entry on the list of restrictions. In one example, when the camera system 100b detects that the audio level is greater than allowed by the list of restrictions, the camera system 100b may generate the signal STAT B. In another example, the camera system 100b may provide regular updates about the detected audio level using the signal STAT B (e.g., the camera system 100b may indicate the audio level in decibels and then update at regular intervals). The signal NTF may be presented by the network 72 to the remote device 74 in response to the signal STAT B. In an example, the notification may indicate that the entry on the list of restrictions for noise level has been violated.

In the location 50n, the person 60n and a bed 78 are shown. The camera system 100n may be configured to count the number of people at the location 50n using the computer vision operations. In an example, the computer vision operations performed by the camera system 100n may detect one person, which may be in compliance with the list of restrictions. The camera system 100n may further perform the audio analysis to detect the noise level. In the example shown, the person 60n may be sleeping and not making noise. Since the person 60n may be in compliance with the list of restrictions, the camera system 100n may not send the signal STAT_N. In some embodiments, the camera system 100n may send the signal STAT_N that shows the number of people and the audio level is in compliance with the list of restrictions.

In some embodiments, the signals STAT_A-STAT_N may not provide details of the behavior of the people 60a-60n to preserve privacy. For example, the signal STAT_N may not indicate that the person 60n is sleeping in the bed 78. The signals STAT_A-STAT_N may merely provide sufficient information to indicate whether or not the renters (e.g., the people 60a-60n) are in compliance with the list of restrictions. For example, the signal STAT_N may provide information that the number of people detected and the noise level was less than the threshold indicated by the list of restrictions in the rental agreement.

In some embodiments, the camera systems 100a-100n may be configured to share data. The data shared between the camera systems 100a-100n may enable additional information to be aggregated for inferences to be made by the camera systems 100a-100n. For example, if the camera systems 100a-100n provide video data and audio data from multiple rooms of the same rental property, the camera systems 100a-100n may share the number of people (e.g., the extracted data 120a-120e) counted in each room to determine a total number of people at the rental property. To ensure privacy, the camera systems 100a-100n may not share the video data and/or the audio data. To ensure privacy, the camera systems 100a-100n may share the results determined by the computer vision operations and/or the audio analysis. For example, each camera system 100a-100n may perform the computer vision operations to determine the number count 120a-120e of people and share the number count 120a-120e to determine a total number of occupants at the rental property. The results shared may be limited to ensure privacy while providing enough information to make a determination about whether the terms of the rental agreement have been breached. For example, the number count 120a-120e may be shared if the number of people is an entry of the rental agreement, but may not be shared if the number of people is not an entry of the rental agreement.

The camera systems 100a-100n may be configured to apply various types of audio analysis (e.g., sound levels, frequency analysis, artificial intelligence for detecting words and/or phrases, etc.). In an example, the camera systems 100a-100n may be configured to determine a sound level of the audio and/or detect the type of audio (e.g., determine whether the detected audio is loud music, a loud animal, loud voices, etc.). In some embodiments, the camera systems 100a-100n may be configured to combine the audio analysis with video analysis (e.g., perform the computer vision analysis to determine the body movements to determine that the people 60a-60n are dancing and perform the audio analysis to determine that there is loud music). The type of analysis performed may be based on the list of restrictions. For example, merely playing music too loudly may be an issue and the notification may be sent based on the sound level without performing the behavioral analysis to determine that the people 60a-60n are dancing (e.g., the sound level may be an issue regardless of what the people 60a-60n are doing).

In some embodiments, the camera systems 100a-100n may be implemented as small, discreet cameras that may be hidden from view. Hiding the camera systems 100a-100n may prevent renters from attempting to obscure the lens. In some embodiments, the camera systems 100a-100n may be implemented in plain view and/or highlighted to bring attention to the camera systems 100a-100n. The camera systems 100a-100n may be configured to detect when the field of view 102a-102n has been obscured (e.g., detect all black video frames, detect if more than a threshold percentage of the video frame is dark, etc.). For an example of a rental property, the camera systems 100a-100n may be explicitly described in the rental agreement, along with the locations of the camera systems 100a-100n and the list of restrictions. Implementing the camera systems 100a-100n such that the camera systems 100a-100n are visible may act as a deterrent to those seeking to rent accommodation and hold parties. In an example, when the renter fills out the rental application form there may be a request to acknowledge that the camera systems 100a-100n are installed and state how many people will be present and whether there will be any pets.

The camera systems 100a-100n may maintain the privacy of the renter. No video data and/or audio data may be streamed or recorded. The computer vision operations may be configured to detect a crowd and/or count people. The camera systems 100a-100n may be configured to detect if the field of view 102a-102n has been obscured in any way. In some embodiments, the camera systems 100a-100n may not make determinations based on sex, race, other physical features, etc. In one example, the camera systems 100a-100n may be configured to detect when each of the people 60a-60n first arrive and then compare the people count 120a-120e to a threshold (e.g., based on the entry in the list of restrictions). For example, the camera systems 100a-100n may determine whether a party is being held at the rental property based on various parameters (e.g., people count, loud noises, music, etc.).

The camera systems 100a-100n may be configured to detect loud sounds (e.g., identifying music, breaking glass, smoke alarms, etc.). The camera systems 100a-100n may be configured to detect pets (e.g., cats, dogs, birds, ferrets, snakes, gerbils, etc.). The camera systems 100a-100n may be configured to count people to determine if more people are detected than the threshold number of people that may be set by the landlord. The list of restrictions may be provided to the renters in the rental agreement. The list of restrictions may be converted to threshold parameters that may be readable by the camera systems 100a-100n. The types of conditions that the camera systems 100a-100n may search for using the computer vision operations and/or the audio analytics may be determined based on the threshold parameters. In an example, if the landlord does not list pets as an entry on the list of restrictions, the computer vision operations may not search for pets. The method of converting the list of restrictions to the threshold parameters may be varied according to the design criteria of a particular implementation.

In some embodiments, the camera systems 100a-100n may be configured to implement computer vision acceleration hardware to perform the computer vision operations. In some embodiments, the camera systems 100a-100n may be configured to perform cropping and/or zooming techniques as part of the computer vision operations to assist in the person and pet detection.

In some embodiments, the camera systems 100a-100n may be configured to implement facial recognition. Facial recognition may represent a trade-off between available types of detections that may be made for the list of restrictions and privacy concerns. In an example, the camera systems 100a-100n may be configured to perform the facial recognition locally (e.g., comparing feature maps from the faces of previously detected people to the features maps currently detected on the people 60a-60n in the location 50). However, a database of feature maps to compare against may comprise a large amount of data (e.g., typically stored using services such as the cloud services 72). Sending the currently detected feature maps for facial recognition may be a potential privacy concern since the data detected by the camera systems 100a-100n would not all be kept locally and then discarded. In some embodiments, depending on the storage capacity available to the camera systems 100a-100n a number of feature maps for faces may be stored locally. In an example, parents may want a limited number of people restricted (e.g., detect a boyfriend/girlfriend when the parents are not home). In some embodiments, particular characteristics 112 may be detected (e.g., hair color, color of clothing, type of clothing worn, etc.).

The signal NTF may be customizable by the landlord. In an example, the landlord may receive a notification on the smartphone 74 when music is detected above the threshold level set by the list of restrictions. In some embodiments, the renter may also receive the notification. For example, if the renter also receives the notification, the renter may have an opportunity to correct the issue (e.g., turn down the music) before the landlord has to intervene. In some embodiments, the notification may provide details of the entry on the list of restrictions that has been violated (e.g., "five people have been detected but only two people are allowed on the property"). Providing a detailed notification may enable the renter to take action to ensure that the property is protected according to the list of restrictions. In some embodiments, the notification may be configured to protect privacy by not indicating the particular entry on the list of restrictions that has been violated. For example, the notification may provide the list of restrictions and indicate that a violation has been detected. In some embodiments, the renter may be able to respond to the notification. The response to the notification may be sent to the landlord (e.g., to acknowledge the notification and confirm they have taken action to correct the violation).

The camera systems 100a-100n may be configured to discard the video data after performing the computer vision operations. The video data may not be stored long term. The video data may not be streamed to a remote location. In an example, to perform the computer vision operations, the camera systems 100a-100n may perform the video analysis on a single video frame. Some additional information from data in a buffer may be used. The camera systems 100a-100n may generate the data (e.g., conclusions, inferences, the number of people 120a-120e, etc.), and the video data may be discarded. The data may be updated as new data is extracted from incoming video frames. However, previous video data is unavailable after being discarded. The previously determined data may be used and/or stored but the video data and/or audio data that the data was extracted from may be discarded. In an example, a history of the data may be stored. For example, the noise level may be recorded along with a time stamp of when the noise level was determined. The history of the data may be compared with complaints. For example, if a neighbor calls in a noise complaint with the police, the camera systems 100a-100n may provide the timestamped noise level to determine whether the neighbor has provided a legitimate complaint.

Figure 3:
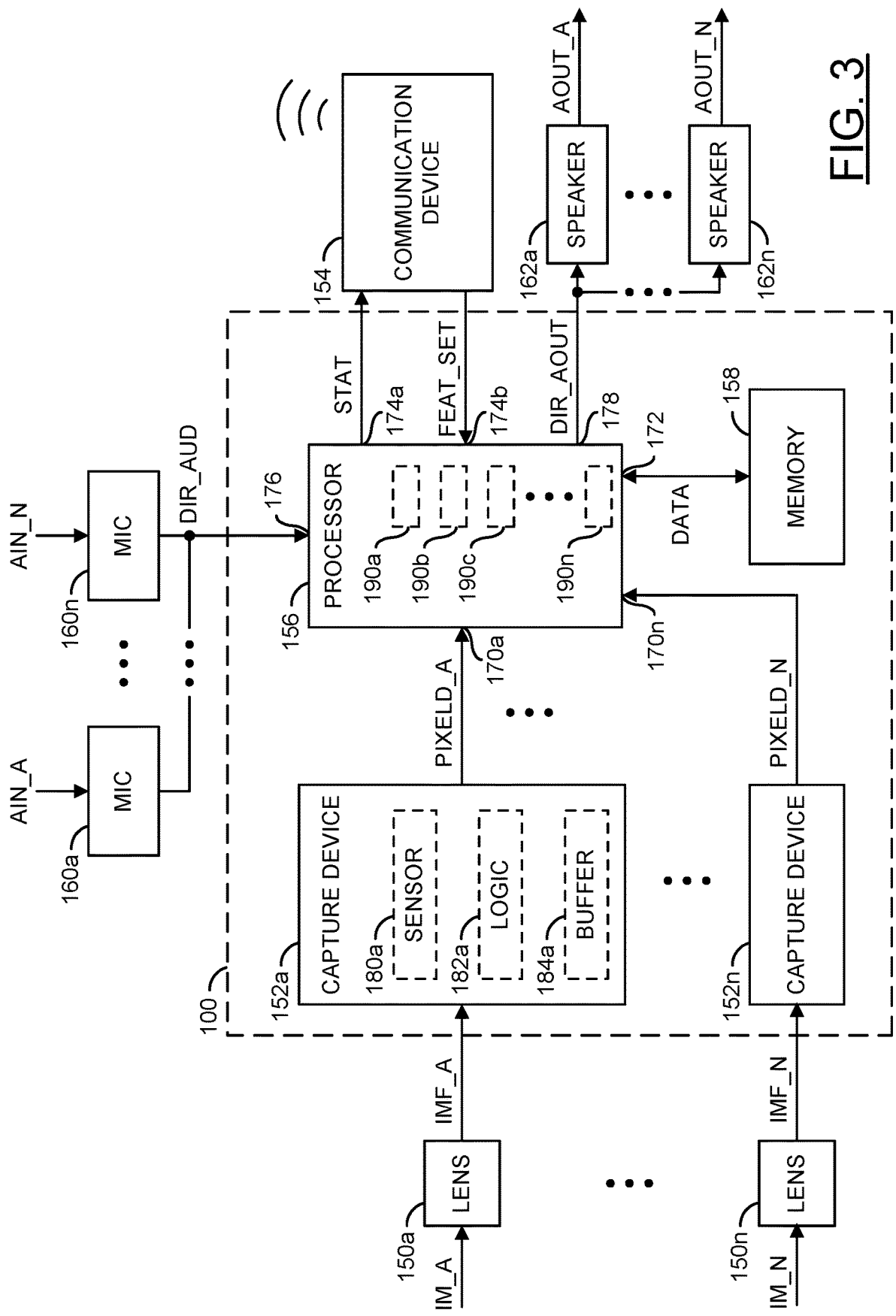
FIG. 3 is a block diagram illustrating an example embodiment of the present invention.

Referring to FIG. 3, a block diagram illustrating an example embodiment of the invention is shown. The apparatus 100 is shown. The apparatus 100 may be a representative example of the camera system 100a-100n shown in association with FIG. 1 and FIG. 2. The apparatus 100 generally comprises blocks (or circuits) 150a-150n, blocks (or circuits) 152a-152n, a block (or circuit) 154, a block (or circuit) 156, a block (or circuit) 158, blocks (or circuits) 160a-160n and/or blocks (or circuits) 162a-162n. The blocks 150a-150n may implement lenses. The circuits 152a-152n may implement capture devices. The circuit 154 may implement a communication device. The circuit 156 may implement a processor. The circuit 158 may implement a memory. The circuits 160a-160n may implement microphones (e.g., audio capture devices). The circuits 162a-162n may implement audio output devices (e.g., speakers). The apparatus 100 may comprise other components (not shown). In the example shown, some of the components 150-162 are shown external to the camera system 100. However, the components 150-162 may be implemented within and/or attached to the camera system 100 (e.g., the speakers 162a-162n may provide better functionality if not located inside a housing of the camera system 100). The number, type and/or arrangement of the components of the apparatus 100 may be varied according to the design criteria of a particular implementation.

In an example implementation, the circuit 156 may be implemented as a video processor. The processor 156 may comprise inputs 170a-170n and/or other inputs. The processor 156 may comprise an input/output 172. The processor 156 may comprise an output 174a and an input 174b. The processor 156 may comprise an input 176. The processor 156 may comprise an output 178 and/or other outputs. The number of inputs, outputs and/or bi-directional ports implemented by the processor 156 may be varied according to the design criteria of a particular implementation.

In the embodiment shown, the capture devices 152a-152n may be components of the apparatus 100. In some embodiments, the capture devices 152a-152n may be separate devices (e.g., remotely connected to the camera system 100, such as a drone, a robot and/or a system of security cameras configured capture video data) configured to send data to the apparatus 100. In one example, the capture devices 152a-152n may be implemented as part of an autonomous robot configured to patrol particular paths such as hallways. Similarly, in the example shown, the wireless communication device 154, the microphones 160a-160n and/or the speakers 162a-162n are shown external to the apparatus 100 but in some embodiments may be a component of (e.g., within) the apparatus 100.

The apparatus 100 may receive one or more signals (e.g., IMF_A-IMF_N), a signal (e.g., FEAT_SET) and/or one or more signals (e.g., DIR_AUD). The apparatus 100 may present the signal STAT (e.g., one of the signals STAT_A-STAT_N shown in association with FIG. 2) and/or a signal (e.g., DIR_AOUT). The capture devices 152a-152n may receive the signals IMF_A-IMF_N from the corresponding lenses 150a-150n. The processor 156 may receive the signal DIR_AUD from the microphones 160a-160n. The processor 156 may present the signal STAT to the communication device 154 and receive the signal FEAT_SET from the communication device 154. For example, the wireless communication device 154 may be a radio-frequency (RF) transmitter. In another example, the communication device 154 may be a Wi-Fi module. In another example, the communication device 154 may be a device capable of implementing RF transmission, Wi-Fi, Bluetooth and/or other wireless communication protocols. The processor 156 may present the signal DIR_AOUT to the speakers 162a-162n.

The lenses 150a-150n may capture signals (e.g., IM_A-IM_N). The signals IM_A-IM_N may be an image (e.g., an analog image) of the environment near the camera system 100 presented by the lenses 150a-150n to the capture devices 152a-152n as the signals IMF_A-IMF_N. The lenses 150a-150n may be implemented as an optical lens. The lenses 150a-150n may provide a zooming feature and/or a focusing feature. The capture devices 152a-152n and/or the lenses 150a-150n may be implemented, in one example, as a single lens assembly. In another example, the lenses 150a-150n may be a separate implementation from the capture devices 152a-152n. The capture devices 152a-152n are shown within the circuit 100. In an example implementation, the capture devices 152a-152n may be implemented outside of the circuit 100 (e.g., along with the lenses 150a-150n as part of a lens/capture device assembly).

The capture devices 152a-152n may be configured to capture image data for video (e.g., the signals IMF_A-IMF_N from the lenses 150a-150n). In some embodiments, the capture devices 152a-152n may be video capturing devices such as cameras. The capture devices 152a-152n may capture data received through the lenses 150a-150n to generate raw pixel data. In some embodiments, the capture devices 152a-152n may capture data received through the lenses 150a-150n to generate bitstreams (e.g., generate video frames). For example, the capture devices 152a-152n may receive focused light from the lenses 150a-150n. The lenses 150a-150n may be directed, tilted, panned, zoomed and/or rotated to provide a targeted view from the camera system 100 (e.g., to provide coverage for a panoramic field of view such as the field of view 102a-102b). The capture devices 152a-152n may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170a-170n of the processor 156.

The capture devices 152a-152n may transform the received focused light signals IMF_A-IMF_N into digital data (e.g., bitstreams). In some embodiments, the capture devices 152a-152n may perform an analog to digital conversion. For example, the capture devices 152a-152n may perform a photoelectric conversion of the focused light received by the lenses 150a-150n. The capture devices 152a-152n may transform the bitstreams into pixel data, images and/or video frames. In some embodiments, the pixel data generated by the capture devices 152a-152n may be uncompressed and/or raw data generated in response to the focused light from the lenses 150a-150n. In some embodiments, the output of the capture devices 152a-152n may be digital video signals.

The communication device 154 may send and/or receive data to/from the apparatus 100. In some embodiments, the communication device 154 may be implemented as a wireless communications module. In some embodiments, the communication device 154 may be implemented as a satellite connection to a proprietary system. In one example, the communication device 154 may be a hard-wired data port (e.g., a USB port, a mini-USB port, a USB-C connector, HDMI port, an Ethernet port, a DisplayPort interface, a Lightning port, etc.). In another example, the communication device 154 may be a wireless data interface (e.g., Wi-Fi, Bluetooth, ZigBee, cellular, etc.).

The communication device 154 may be configured to receive the signal FEAT_SET from the network 72. The signal FEAT_SET may comprise a feature set that corresponds to the rental agreement. The feature set information may comprise instructions for the processor 156 for determining a breach of the rental agreement. Details of the feature set information may be described in association with FIG. 4.

The processor 156 may receive the signals PIXELD_A-PIXELD_N from the capture devices 152a-152n at the inputs 170a-170n. The processor 156 may send/receive a signal (e.g., DATA) to/from the memory 158 at the input/output 172. The processor 156 may send the signal STAT to the communication device 154 via the output port 174a. In some embodiments, the port 174a may be an input/output port and the processor 156 may receive one of the signals STAT_A-STAT_N from the other camera systems 100a-100n. The processor 156 may receive the signal FEAT_SET from the communication device 154 via the input port 174b. The processor 156 may receive the signal DIR_AUD from the microphones 160a-160n at the port 176. The processor 156 may send the signal DIR_AOUT to the speakers 162a-162n via the port 178. In an example, the processor 156 may be connected through a bi-directional interface (or connection) to the capture devices 152a-152n, the communication device 154, the memory 158, the microphones 160a-160n and/or the speakers 162a-162n. The processor 156 may store and/or retrieve data from the memory 158. The memory 158 may be configured to store computer readable/executable instructions (or firmware). The instructions, when executed by the processor 156, may perform a number of steps.

The signal PIXELD_A-PIXELD_N may comprise raw pixel data providing a field of view captured by the lenses 150a-150n. The processor 156 may be configured to generate video frames from the pixel data PIXELD_A-PIXELD_N. The video frames generated by the processor 156 may be used internal to the processor 156. In some embodiments, the video frames may be communicated to the memory 158 for temporary storage. Generally, the video frames generated by the processor 156 may not leave the processor 156. The processor 156 may be configured to discard the video frames generated.

The processor 156 may be configured to make decisions based on analysis of the video frames generated from the signals PIXELD_A-PIXELD_N. The processor 156 may generate the signal STAT, the signal DATA, the signal DIR_AOUT and/or other signals (not shown). The signal STAT, the signal DATA and/or the signal DIR_AOUT may each be generated (in part) based on one or more decisions made and/or functions performed by the processor 156. The decisions made and/or functions performed by the processor 156 may be determined based on data received by the processor 156 at the inputs 170a-170n (e.g., the signals PIXELD_A-PIXELD_N), the input 172, the input 174b, the input 176 and/or other inputs.

The inputs 170a-170n, the input/output 172, the output 174a, the input 174b, the input 176, the output 170 and/or other inputs/outputs may implement an interface. The interface may be implemented to transfer data to/from the processor 156, the communication device 154, the capture devices 152a-152n, the memory 158, the microphones 160a-160n, the speakers 162a-162n and/or other components of the apparatus 100. In one example, the interface may be configured to receive (e.g., via the inputs 170a-170n) the pixel data signals PIXELD_A-PIXELD_N each from a respective one of the capture devices 152a-152n. In another example, the interface may be configured to receive (e.g., via the input 176) the directional audio DIR_AUD. In yet another example, the interface may be configured to transmit parameters and/or statistics about the video frames (e.g., the signal STAT) and/or the converted data determined based on the computer vision operations to the communication device 154. In still another example, the interface may be configured to receive the feature set information FEAT_SET (e.g., via the input port 174b) from the communication device 154. In another example, the interface may be configured to transmit directional audio output (e.g., the signal DIR_AOUT) to each of the speakers 162a-162n. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal STAT may be presented to the communication device 154. In some embodiments, the signal STAT may comprise parameters and/or statistics determined by the processor 156 about the video frames. The signal STAT may be generated in response to the computer vision operations performed. The video frames may be encoded, cropped, stitched and/or enhanced versions of the pixel data received from the signals PIXELD_A-PIXELD_N. In an example, the video frames may be a high resolution, digital, encoded, de-warped, stabilized, cropped, blended, stitched and/or rolling shutter effect corrected version of the signals PIXELD_A-PIXELD_N.

In some embodiments, the signal STAT may be a text message (e.g., a string of human readable characters). In some embodiments, the signal STAT may be a symbol that indicates an event or status (e.g., sound symbol indicating loud noise has been detected, an animal symbol indicating a pet has been detected, a symbol of a group of people to indicate that too many people have been detected at the location 50, etc.). The signal STAT may be generated based on video analytics (e.g., computer vision operations) performed by the processor 156 on the video frames generated from the pixel data PIXELD_A-PIXELD_N. The processor 156 may be configured to perform the computer vision operations to detect objects and/or events in the video frames and then convert the detected objects and/or events into statistics and/or parameters. The data determined by the computer vision operations may be converted to the human-readable format by the processor 156. The data from the computer vision operations that has been converted to the human-readable format may be communicated as the signal STAT.

In some embodiments, the signal STAT may be data generated by the processor 156 (e.g., video analysis results, audio/speech analysis results, etc.) that may be communicated to a cloud computing service in order to aggregate information and/or provide training data for machine learning (e.g., to improve object detection, to improve audio detection, etc.). The type of information communicated by the signal STAT may be varied according to the design criteria of a particular implementation.

The apparatus 100 may implement a camera system. In some embodiments, the camera system 100 may be implemented as a drop-in solution (e.g., installed as one component). In an example, the camera system 100 may be a device that may be installed as an after-market product (e.g., a retro-fit for a drone, a retro-fit for a security system, etc.). In some embodiments, the apparatus 100 may be a component of a security system. The number and/or types of signals and/or components implemented by the camera system 100 may be varied according to the design criteria of a particular implementation.

The video data of the targeted view captured in the field of view 102a-102b may be generated from the signals/bitstreams/data PIXELD_A-PIXELD_N. The capture devices 152a-152n may present the signals PIXELD_A-PIXELD_N to the inputs 170a-170n of the processor 156. The signals PIXELD_A-PIXELD_N may be used by the processor 156 to generate the video frames/video data. In some embodiments, the signals PIXELD_A-PIXELD_N may be video streams captured by the capture devices 152a-152n. In some embodiments, the capture devices 152a-152n may be implemented in the camera system 100. In some embodiments, the capture devices 152a-152n may be configured to add to existing functionality to the camera system 100.

Each of the capture devices 152a-152n may comprise a block (or circuit) 180, a block (or circuit) 182, and/or a block (or circuit) 184. The circuit 180 may implement a camera sensor (e.g., a complementary metal-oxide-semiconductor (CMOS) sensor). The circuit 182 may implement a camera processor/logic. The circuit 184 may implement a memory buffer. As a representative example, the capture device 152a is shown comprising the sensor 180a, the logic block 182a and the buffer 184a. Similarly, the capture devices 152b-152n may comprise the camera sensors 180b-180n, the logic blocks 182b-182n and the buffers 184b-184n. The sensors 180a-180n may each be configured to receive light from the corresponding one of the lenses 150a-150n and transform the light into digital data (e.g., the bitstreams).

In one example, the sensor 180a of the capture device 152a may receive light from the lens 150a. The camera sensor 180a of the capture device 152a may perform a photoelectric conversion of the light from the lens 150a. In some embodiments, the sensor 180a may be an oversampled binary image sensor. The logic 182a may transform the bitstream into a human-legible content (e.g., pixel data and/or video data). For example, the logic 182a may receive pure (e.g., raw) data from the camera sensor 180a and generate pixel data based on the raw data (e.g., the bitstream). The memory buffer 184a may store the raw data and/or the processed bitstream.

For example, the frame memory and/or buffer 184a may store (e.g., provide temporary storage and/or cache) the pixel data and/or one or more of the video frames (e.g., the video signal).

The microphones 160a-160n may be configured to capture incoming audio and/or provide directional information about the incoming audio. Each of the microphones 160a-160n may receive a respective signal (e.g., AIN_A-AIN_N). The signals AIN_A-AIN_N may be audio signals from the environment 50 near the apparatus 100. For example, the signals AIN_A-AIN_N may be ambient noise in the environment 50 and/or the audio 114a-114n from the subjects 60a-60n. The microphones 160a-160n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 160a-160n may provide the signal DIR_AUD to the interface 176. The apparatus 100 may comprise the interface 176 configured to receive data (e.g., the signal DIR_AUD) from one or more of the microphones 160a-160n. In one example, data from the signal DIR_AUD presented to the interface 176 may be used by the processor 156 to determine the location of the source of the audio 114a-114n. In another example, the microphones 160a-160n may be configured to determine the location of the audio 114a-114n and present the location to the interface 176 as the signal DIR_AUD.

The number of microphones 160a-160n may be varied according to the design criteria of a particular implementation. The number of microphones 160a-160n may be selected to provide sufficient directional information about the incoming audio (e.g., the number of microphones 160a-160n implemented may be varied based on the accuracy and/or resolution of directional information acquired). In an example, 2 to 6 of the microphones 160a-160n may be implemented. In some embodiments, an audio processing component may be implemented with the microphones 160a-160n to process and/or encode the incoming audio signals AIN_A-AIN_N. In some embodiments, the processor 156 may be configured with on-chip audio processing to encode the incoming audio signals AIN_A-AIN_N. The microphones 160a-160n may capture audio of the environment 50. The apparatus 100 may be configured to synchronize the audio captured with the images captured by the capture devices 152a-152n.

The processor 156 may be configured to execute computer readable code and/or process information. The processor 156 may be configured to receive input and/or present output to the memory 158. The processor 156 may be configured to present and/or receive other signals (not shown). The number and/or types of inputs and/or outputs of the processor 156 may be varied according to the design criteria of a particular implementation.

The processor 156 may receive the signals PIXELD_A-PIXELD_N, the signal DIR AUDIO and/or the signal DATA. The processor 156 may make a decision based on data received at the inputs 170a-170n, the input 172, the input 174b, the input 176 and/or other input. For example, other inputs may comprise external signals generated in response to user input, external signals generated by the microphones 160a-160n and/or internally generated signals such as signals generated by the processor 156 in response to analysis of the video frames and/or objects detected in the video frames. The processor 156 may adjust the video data (e.g., crop, digitally move, physically move the camera sensor 180, etc.) of the video frames. The processor 156 may generate the signal STAT and/or the signal DIR_AOUT in response to data received by the inputs 170a-170n, the input 172, the input 174b, the input 176 and/or the decisions made in response to the data received by the inputs 170a-170n, the input 172, the input 174b and/or the input 176.

The signal STAT and/or the signal DIR_AOUT may be generated to provide an output in response to the captured video frames and the video analytics performed by the processor 156. For example, the video analytics may be performed by the processor 156 in real-time and/or near real-time (e.g., with minimal delay).

The cropping, downscaling, blending, stabilization, packetization, encoding, compression and/or conversion performed by the processor 156 may be varied according to the design criteria of a particular implementation. For example, the video frames generated by the processor 156 may be a processed version of the signals PIXELD_A-PIXELD_N configured to enable detection of the objects 110a-110n and/or determination of the characteristics 112. In some embodiments, the video data may be encoded at a high bitrate. For example, the signal may be generated using a lossless compression and/or with a low amount of lossiness.

In some embodiments, the video frames may be some view (or derivative of some view) captured by the capture devices 152a-152n. For example, the video frames may comprise a portion of the panoramic video captured by the capture devices 152a-152n. In another example, the video frames may comprise a region of interest selected and/or cropped from the panoramic video frame by the processor 156 (e.g., upscaled, oversampled and/or digitally zoomed) to enable a high precision of object detection. In some embodiments, the video frames may provide a series of cropped and/or enhanced panoramic video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 156 to see the location 50 better than a person would be capable of with human vision.

The memory 158 may store data. The memory 158 may be implemented as a cache, flash memory, DRAM memory, etc. The type and/or size of the memory 158 may be varied according to the design criteria of a particular implementation. The data stored in the memory 158 may correspond to a video file, user profiles, user permissions, the rental agreement, the terms and/or entries of the rental agreement, contact information for the renter/landlord, etc.

The lenses 150a-150n (e.g., camera lenses) may be directed to provide a panoramic view from the camera system 100. The lenses 150a-150n may be aimed to capture environmental data (e.g., light). The lens 150a-150n may be configured to capture and/or focus the light for the capture devices 152a-152n. Generally, the camera sensors 180a-180n may be located behind each of the respective lenses 150a-150n. Based on the captured light from the lenses 150a-150n, the capture devices 152a-152n may generate a bitstream and/or raw pixel data.

Embodiments of the processor 156 may perform video stitching operations on the signals PIXELD_A-PIXELD_N. In one example, each of the pixel data signals PIXELD_A-PIXELD_N may provide a portion of a panoramic view and the processor 156 may crop, blend, synchronize and/or align the pixel data from the signals PIXELD_A-PIXELD_N to generate the panoramic video frames. In some embodiments, the processor 156 may be configured to perform electronic image stabilization (EIS). The processor 156 may perform de-warping on the video frames. The processor 156 may perform intelligent video analytics on the de-warped video frames. The processor 156 discard the video frames after the video analytics and/or computer vision has been performed.

The encoded video frames may be processed locally and discarded. In one example, the encoded, panoramic video may be stored locally by the memory 158 to enable the processor 156 to facilitate the computer vision analysis and then discarded. The processor 156 may discard the video frames as soon as possible after the video frames are no longer needed. Generally, after the processor 156 determines the parameters and/or statistics 120a-120n, the video frames are no longer needed.

The processor 156 may receive an input to generate the video frames (e.g., the signals PIXELD_A-PIXELD_N) from the CMOS sensor(s) 180a-180n. The pixel data signals PIXELD_A-PIXELD_N may be enhanced by the processor 156 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video.

Equirectangular 360 video may also be called spherical panoramas. Panoramic video may be a video that provides a field of view that is larger than the field of view that may be displayed on a device used to playback the video. For example, the field of view 102a-102b captured by the camera system 100 may be used to generate panoramic video such as a spherical video, a hemispherical video, a 360 degree video, a wide angle video, a video having less than a 360 field of view, etc.

Panoramic videos may comprise a view of the environment near the camera system 100. In one example, the entire field of view 102a-102b of the panoramic video may be captured at generally the same time (e.g., each portion of the panoramic video represents the view from the camera system 100 at one particular moment in time). In some embodiments (e.g., when the camera system 100 implements a rolling shutter sensor), a small amount of time difference may be present between some portions of the panoramic video. Generally, each video frame of the panoramic video comprises one exposure of the sensor (or the multiple sensors 180a-180n) capturing the environment near the camera system 100.

In some embodiments, the field of view 102a-102b may provide coverage for a full 360 degree field of view. In some embodiments, less than a 360 degree view may be captured by the camera system 100 (e.g., a 270 degree field of view, a 180 degree field of view, etc.). In some embodiments, the panoramic video may comprise a spherical field of view (e.g., capture video above and below the camera system 100). For example, the camera system 100 may be mounted on a ceiling and capture a spherical field of view of the area below the camera system 100. In some embodiments, the panoramic video may comprise a field of view that is less than a spherical field of view (e.g., the camera system 100 may be configured to capture the ground below and the areas to the sides of the camera system 100 but nothing directly above). The implementation of the camera system 100 and/or the captured field of view 102a-102b may be varied according to the design criteria of a particular implementation.

In embodiments implementing multiple lenses, each of the lenses 150a-150n may be directed towards one particular direction to provide coverage for a full 360 degree field of view. In embodiments implementing a single wide angle lens (e.g., the lens 150a), the lens 150a may be located to provide coverage for the full 360 degree field of view (e.g., on the bottom of the camera system 100 in a ceiling mounted embodiment, on the bottom of a drone camera, etc.). In some embodiments, less than a 360 degree view may be captured by the lenses 150a-150n (e.g., a 270 degree field of view, a 180 degree field of view, etc.). In some embodiments, the lenses 150a-150n may move (e.g., the direction of the capture devices may be controllable). In some embodiments, one or more of the lenses 150a-150n may be configured to implement an optical zoom (e.g., the lenses 150a-150n may zoom in/out independent of each other).

In some embodiments, the apparatus 100 may be implemented as a system on chip (SoC). For example, the apparatus 100 may be implemented as a printed circuit board comprising one or more components (e.g., the capture devices 152a-152n, the processor 156, the communication device 154, the memory 158, etc.). The apparatus 100 may be configured to perform intelligent video analysis on the video frames of the de-warped, panoramic video. The apparatus 100 may be configured to crop and/or enhance the panoramic video.

In some embodiments, the processor 156 may be configured to perform sensor fusion operations. The sensor fusion operations performed by the processor 156 may be configured to analyze information from multiple sources (e.g., the capture devices 152a-152n and the microphones 160a-160n). By analyzing various data from disparate sources, the sensor fusion operations may be capable of making inferences about the data that may not be possible from one of the data sources alone. For example, the sensor fusion operations implemented by the processor 156 may analyze video data (e.g., mouth movements of the subjects 60a-60n) as well as the speech patterns from the directional audio DIR_AUD. The disparate sources may be used to develop a model of a scenario to support decision making. For example, the processor 156 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 156 may implement convolutional neural network capabilities. The convolutional neural network capabilities may implement computer vision using deep learning techniques. The convolutional neural network capabilities may be configured to implement pattern and/or image recognition using a training process through multiple layers of feature-detection.

The signal DIR_AOUT may be an audio output. For example, the processor 156 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message informing the people 60a-60n that the rental agreement has been breached. In some embodiments, the signal DIR_AOUT may not be generated until an event has been detected by the processor 156 using the computer vision operations.

The signal DIR_AOUT may comprise directional and/or positional audio output information for the speakers 162a-162n. The speakers 162a-162n may receive the signal DIR_AOUT, process the directional and/or positional information and determine which speakers and/or which channels will play back particular audio portions of the signal DIR_AOUT. The speakers 162a-162n may generate the signals AOUT_A-AOUT_N in response to the signal DIR_AOUT. The signals AOUT_A-AOUT_N may be the audio message played to the people 60a-60n. For example, the speakers 162a-162n may emit a pre-recorded message in response to a detected event. The signal DIR_AOUT may be a signal generated in a format that provides directional information for the signals AOUT_A-AOUT_N.

The number of speakers 162a-162n may be varied according to the design criteria of a particular implementation. The number of speakers 162a-162n may be selected to provide sufficient directional channels for the outgoing audio (e.g., the number of speakers 162a-162n implemented may be varied based on the accuracy and/or resolution of directional audio output). In an example, 1 to 6 of the speakers 162a-162n may be implemented. In some embodiments, an audio processing component may be implemented by the speakers 162a-162n to process and/or decode the output audio signals DIR_AOUT. In some embodiments, the processor 156 may be configured with on-chip audio processing. In some embodiments, the signal DIR_AOUT may playback audio received from the remote devices 54a-54n in order to implement a 2-way real-time audio communication.

The video pipeline of the processor 156 may be configured to perform de-warping, cropping, enhancements, rolling shutter corrections, stabilizing, downscaling, packetizing, compression, conversion, blending, synchronizing, and/or other video operations. The architecture of the video pipeline of the processor 156 may enable the video operations to be performed on high resolution video and/or high bitrate video data in real-time and/or near real-time. The video pipeline of the processor 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 250 may enable 4K ultra high resolution with H.264 encoding at double real time speed (e.g., 60 fps), 4K ultra high resolution with H.265/HEVC at 30 fps and/or 4K AVC encoding. Since the video frames generated by the processor 156 may be discarded after the data is extracted, encoding operations of the processor 156 may not be necessary. For example, while the processor 156 may be capable of performing the encoding operations, in the implementation of the camera systems 100a-100n, the encoding may not need to be performed. The type of video operations and/or the type of video data operated on by the processor 156 may be varied according to the design criteria of a particular implementation.

The sensors 180a-180n may each implement a high-resolution sensor. Using the high resolution sensors 180a-180n, the processor 156 may combine over-sampling of the image sensors 180a-180n with digital zooming within a cropped area. The over-sampling and digital zooming may each be one of the video operations performed by the processor 156. The over-sampling and digital zooming may be implemented to deliver higher resolution images within the total size constraints of a cropped area.

In some embodiments, one or more of the lenses 150a-150n may implement a fisheye lens. One of the video operations implemented by the processor 156 may be a dewarping operation. The processor 156 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 156 may be configured to crop (e.g., trim to) a region of interest from a full video frame (e.g., generate the region of interest video frames). The processor 156 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 156 may update the selected region of interest coordinates and dynamically update the cropped section (e.g., the directional microphones 106a-106n may dynamically update the location based on the directional audio captured). The cropped section may correspond to the area of interest selected. As the area of interest changes, the cropped portion may change. For example, the selected coordinates for the area of interest may change from frame to frame, and the processor 156 may be configured to crop the selected region in each frame.

The processor 156 may be configured to over-sample the image sensors 180a-180n. The over-sampling of the image sensors 180a-180n may result in a higher resolution image. The processor 156 may be configured to digitally zoom into an area of a video frame. For example, the processor 156 may digitally zoom into the cropped area of interest. For example, the processor 156 may establish the area of interest based on the directional audio, crop the area of interest, and then digitally zoom into the cropped region of interest video frame.

The dewarping operations performed by the processor 156 may adjust the visual content of the video data. The adjustments performed by the processor 156 may cause the visual content to appear natural (e.g., appear as seen by a person viewing the location corresponding to the field of view of the capture devices 152a-152n). In an example, the dewarping may alter the video data to generate a rectilinear video frame (e.g., correct artifacts caused by the lens characteristics of the lenses 150a-150n). The dewarping operations may be implemented to correct the distortion caused by the lenses 150a-150n. The adjusted visual content may be generated to enable more accurate and/or reliable object detection.

Various features (e.g., dewarping, digitally zooming, cropping, etc.) may be implemented in the processor 156 as hardware modules. Implementing hardware modules may increase the video processing speed of the processor 156 (e.g., faster than a software implementation). The hardware implementation may enable the video to be processed while reducing an amount of delay. The hardware components used may be varied according to the design criteria of a particular implementation.

The processor 156 is shown comprising a number of blocks (or circuits) 190a-190n. The blocks 190a-190n may implement various hardware modules implemented by the processor 156. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 156 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 156 using the dedicated hardware modules 190a-190n may enable the processor 156 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received in the signal FEAT_SET. The directed acyclic graph may define the video operations to perform for extracting the data 120a-120n from the video frames. For example, the directed acyclic graph may define various mathematical weighting to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of the objects 110a-110n through multiple layers of feature detection. The CNN module 190b may be configured to calculate descriptors based on the feature detection performed. The descriptors may enable the processor 156 to determine a likelihood that pixels of the video frames correspond to particular objects (e.g., the people 60a-60n, pets, items, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 190b as a dedicated hardware module of the processor 156 may enable the apparatus 100 to perform the computer vision operations locally (e.g., on-chip) without relying on processing capabilities of a remote device (e.g., communicating data to a cloud computing service). The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object to match against (e.g., reference objects) may be customized using an open operand stack (enabling programmability of the processor 156 to implement various directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics 112) of the detected objects 110a-110n. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 150a-150n may represent one coordinate (e.g., a location coordinate on a third axis) for a depth location of the body part in 3D space. Using the location of various body parts in 3D space, the processor 156 may determine body position, and/or body characteristics of the people 60a-60n.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 156. The CNN module 190b may conduct inferences against the machine learning model (e.g., to perform object detection). The training may comprise determining weight values for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels, the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
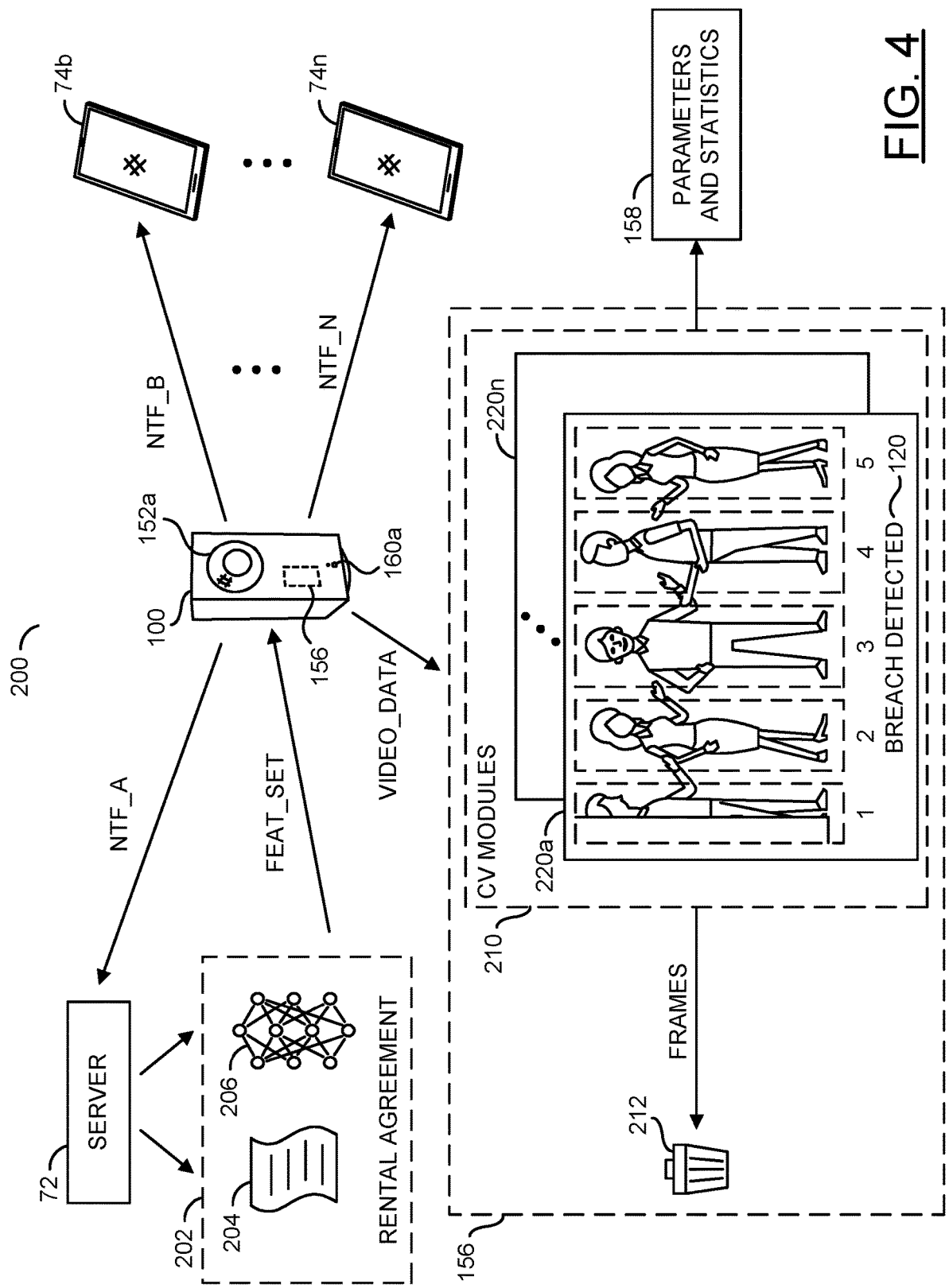
FIG. 4 is a diagram illustrating detecting a breach of a rental property agreement.

Referring to FIG. 4, a diagram illustrating detecting a breach of a rental property agreement is shown. An example scenario 200 is shown. The example scenario 200 may comprise the server 72, remote devices 74b-74n and/or the camera system 100. The capture device 152a and the microphone 160a are shown on the camera system 100. The processor 156 is shown within the camera system 100. The example scenario 200 may further comprise a visualization of the memory 158, the processor 156 and/or a rental agreement 202.

The server 72 may be configured to generate the rental agreement 202. The rental agreement 202 may comprise a text (e.g., human-readable) version 204 and a machine readable version 206. The text version 204 of the rental agreement 202 may be used to enable both the property owner and the renter to view and understand the terms and conditions of the rental agreement 202. The machine readable version 206 may comprise a neural network and/or computer readable instructions that define the terms and conditions of the rental agreement 202 that may be readable by the processor 156 of the camera system 100 in order to generate the detection parameters). For example, the machine readable version 206 may be generated according to an API compatible with the camera system 100. The text version 204 and/or the machine readable version 206 of the rental agreement may be provided to the camera system 100 in the signal FEAT_SET.

The text version 204 and/or the machine readable version 206 of the rental agreement 202 may define what may be considered a breach of the rental agreement 202 at the location 50. The renter and the landlord may refer to the text version 204 of the rental agreement 202 to determine what is acceptable usage of the location 50 and what may not be acceptable usage of the location 50. The camera system 100 may analyze the video frames based on the machine readable version 206. The machine readable version 206 may correspond to the text version 204. In an example, if one of the terms of the rental agreement is that only four people are allowed at the location 50, then the text version 204 may comprise an entry (e.g., "Number of guests allowed: 4") and the machine readable version 206 may comprise instructions for the processor 156 to search the video frames to determine the number of people 60a-60n detected and determine whether more than four guests have been detected. The type of data and/or the format of the text version 204 and/or the machine readable version 206 may be varied according to the design criteria of a particular implementation.

The camera system 100 is shown receiving the signal FEAT_SET based on the rental agreement 202 from the server 72. The camera system 100 is shown generating the signals NTF_A-NTF_N. In the example shown, the signal NTF_A may be communicated to the server 72 and the signals NTF_B-NTF_N may be communicated to the remote devices 74b-74n. In some embodiments, the camera system 100 may communicate the signal STAT (as shown in association with FIG. 3) to the server 72 and the server 72 may communicate the signal(s) NTF_A-NTF_N to the remote devices 74a-74n. In an example, the server 72 may securely store the contact information for the owners of the smartphones 74a-74n (e.g., the renters and/or the landlords).

The camera system 100 may receive the signal FEAT_SET from the server 72. The processor 156 may convert the feature set information in the signal FEAT_SET to detection parameters. The camera system 100 may capture pixel data of the rental property location 50 and generate the video frames from the pixel data PIXELD_A-PIXELD_N. The camera system 100 is shown generating a signal (e.g., VIDEO_DATA). The signal VIDEO_DATA may comprise the video frames generated by the processor 156. The signal VIDEO_DATA may comprise data used internally by the processor 156. In an example, the signal VIDEO_DATA may never be communicated from the camera system 100.

In the example scenario 200, the video frames VIDEO_DATA are shown being used by the processor 156. In an example, the video frames may be operated on using a video processing pipeline implemented by processor 156 of the camera system 100. The processor 156 may comprise a block (or circuit) 210 and/or a block (or circuit) 212. The block 210 may implement computer vision modules. The block 212 may represent a discard location of the processor 156. The computer vision modules 210 and/or the discard location 212 may comprise components of the video processing pipeline of the processor 156. The processor 156 may comprise other components (not shown). The number, type and/or arrangement of the components of the processor 156 may be varied according to the design criteria of a particular implementation.

Video frames 220a-220n are shown being operated on by the computer vision modules 210. The video frames 220a-220n may be the data in the signal VIDEO FRAMES. The video frames 220a-220n may be generated by the processor 156 in response to the pixel data PIXELD_A-PIXELD_N received from the capture devices 152a-152n. In the example shown, the video frame 220a may generally correspond to the location 50 shown in association with FIG. 1. The computer vision modules 210 of the processor 156 may perform the video operations (e.g., the analytics using computer vision) locally (e.g., the video frames 220a-220n may not leave the apparatus 100).

The feature set information in the signal FEAT_SET may comprise instructions that may be compatible with the computer vision modules 210 of the processor 156. In an example, the signal FEAT_SET may be configured to provide the machine readable version 206 of the rental agreement 202 in a format that may be compatible with the camera system 100. The feature set information may provide the parameters that the computer vision modules 210 may use to analyze the video frames 220a-220n. The parameters may define the criteria that the computer vision modules 210 use to determine whether there has been a breach of the rental agreement 202. The signal FEAT_SET may comprise parameters for video (e.g., pet detection, types of pets allowed, behavior allowed, number of guests allowed, locations of particular items, etc.). The signal FEAT_SET may further comprise parameters for audio (e.g., a maximum audio level, frequencies allowed, times of day that particular audio levels are allowed, etc.). Generally, the computer vision modules 210 may compare the characteristics 112 detected in the video frames 220a-220n with the rental agreement 202 by using the parameters defined by the feature set information. The information provided in the feature set information may be varied according to the design criteria of a particular implementation.

Part of the video processing pipeline of the processor 156 may comprise the computer vision modules 210. The computer vision modules 210 may be configured to perform object detection, classify objects, and/or extract data from the video frames 220a-220n. The computer vision modules 210 may be configured to detect the objects 110a-110n in the video frames 220a-220n and/or generate the extracted data 120a-120n about the detected objects 110a-110n based on the characteristics 112 of the objects 110a-110n. In the example diagram shown, the video frames 220a-220n (e.g., the signal VIDEO_DATA) may be presented to computer vision modules 210 of the video processing pipeline. The processor 156 may compare the data extracted with the detection parameters (e.g., the feature set information) of the signal FEAT_SET according to the machine readable version 206 of the rental agreement 202 to determine whether or not there has been a breach of the conditions of the rental agreement 202.

After the video frames 220a-220n have been analyzed by the computer vision operations performed by the processor 156, the video frames 220a-220n may be discarded. In the example shown, the garbage can 212 may represent the processor 156 implementing a discarding method for the camera system 100. The video frames 220a-220n may be passed from the video processing pipeline to the deletion function 212 to make the video frames 220a-220n unavailable (e.g., flushed from cache, flagged to be overwritten, redirected to/dev/null, etc.). To ensure that privacy of the renter (or other people) is protected, no images or audio may ever leave the camera system 100. The video data and/or audio data may be eliminated after processing and may be unavailable for communication beyond the camera system 100 (e.g., not be stored to long-term memory, not communicated to another device, etc.).

In the example shown, the video processing pipeline of the processor 156 may detect a breach in the terms of the rental agreement 202 (e.g., too many people have been detected at the rental property 50). For example, the feature set may provide instructions for counting the number of people in the video frames 220a-220n, and the computer vision modules 210 may detect a greater number of visitors (e.g., 5) than the maximum allowable number of visitors in the rental agreement 202 (e.g., 3). The computer vision modules 210 may extract the data 120 that indicates the number of people in the video frames 220a-220n (and additional data according to the other detection parameters). In the example shown, the extracted data 120 may indicate a breach of the rental agreement 202.

Data that does not correspond to the detection parameters may be ignored. In one example, if pets are not part of the rental agreement 202 (e.g., the rental agreement does not restrict having pets at the location 50), then the computer vision modules 210 may not search for pets in video frames 220a-220n. In another example, if pets are not part of the rental agreement 202, the computer vision modules 210 may still perform a search for pets as part of the general computer vision operations performed, but the information about the pets may not be included as part of the extracted data 120 (e.g., any information not defined by the rental agreement may be discarded along with the video frames 220a-220n).

The extracted data 120 may be stored by the camera system 100, but the video frames and/or the audio that corresponds to the data extracted may be deleted. The extracted data 120 is shown stored as the parameters and statistics in the memory 158. The extracted data 120 (e.g., the parameters and statistics) may be used by the processor 156 to determine whether there has been a breach of the rental agreement 202.

When the computer vision modules 210 detect that the extracted data 120 matches the detection parameters of the machine readable version 206, the breach of the rental agreement 202 may be detected. In an example, the feature set signal FEAT_SET may provide instructions to detect whether there are more than three visitors at the rental property 50 and the camera system 100 may use the detection parameters to monitor whether more than three visitors have been detected in the video frames 220a-220n. In some embodiments, the computer vision modules 210 and/or audio analytics modules may determine when the breach of the rental agreement 202 has been detected. In some embodiments, the processor 156 may analyze the parameters and statistics 120 stored in the memory 158 after the video frames 220a-220n have been discarded to determine whether a breach of the rental agreement 202 has been detected.

In response to the breach of the rental agreement 202, the camera system 100 may generate a notification. In the example shown, multiple notifications NTF_A-NTF_N may be generated. In some embodiments, the camera system 100 may not receive contact information about the renter or the property owner. The camera system 100 may provide a notification signal (e.g., NTF_A) to the server 72, and then the server 72 may contact the property owner and/or the renter (e.g., the server 72 may store the contact information of the users). In some embodiments, the signal FEAT_SET may comprise the contact information of the users and the camera system 100 may use the communications device 154 to contact the property owner and/or the renter. For example, a signal (e.g., NTF_B) may be communicated to the smartphone (or other computing device) 74b of the property owner and a signal (e.g., NTF_N) may be communicated to the smartphones (or other computer devices) 74n of the renter. The camera system 100 may be configured to provide the notification to other parties as defined in the rental agreement 202. The notification may indicate that there has been a breach of the terms of the rental agreement 202. The notification may not comprise the video and/or audio associated with the breach of the rental agreement (e.g., the video and/or audio may no longer be available).

In some embodiments, the camera system 100 may provide the signal STAT to the server 72. The signal STAT may comprise the extracted data 120. The server 72 may use the extracted data 120 (e.g., the parameters and statistics) to determine whether there has been a breach of the rental agreement 202 and/or generate the notification signals NTF_A-NTF_N.

Figure 5:
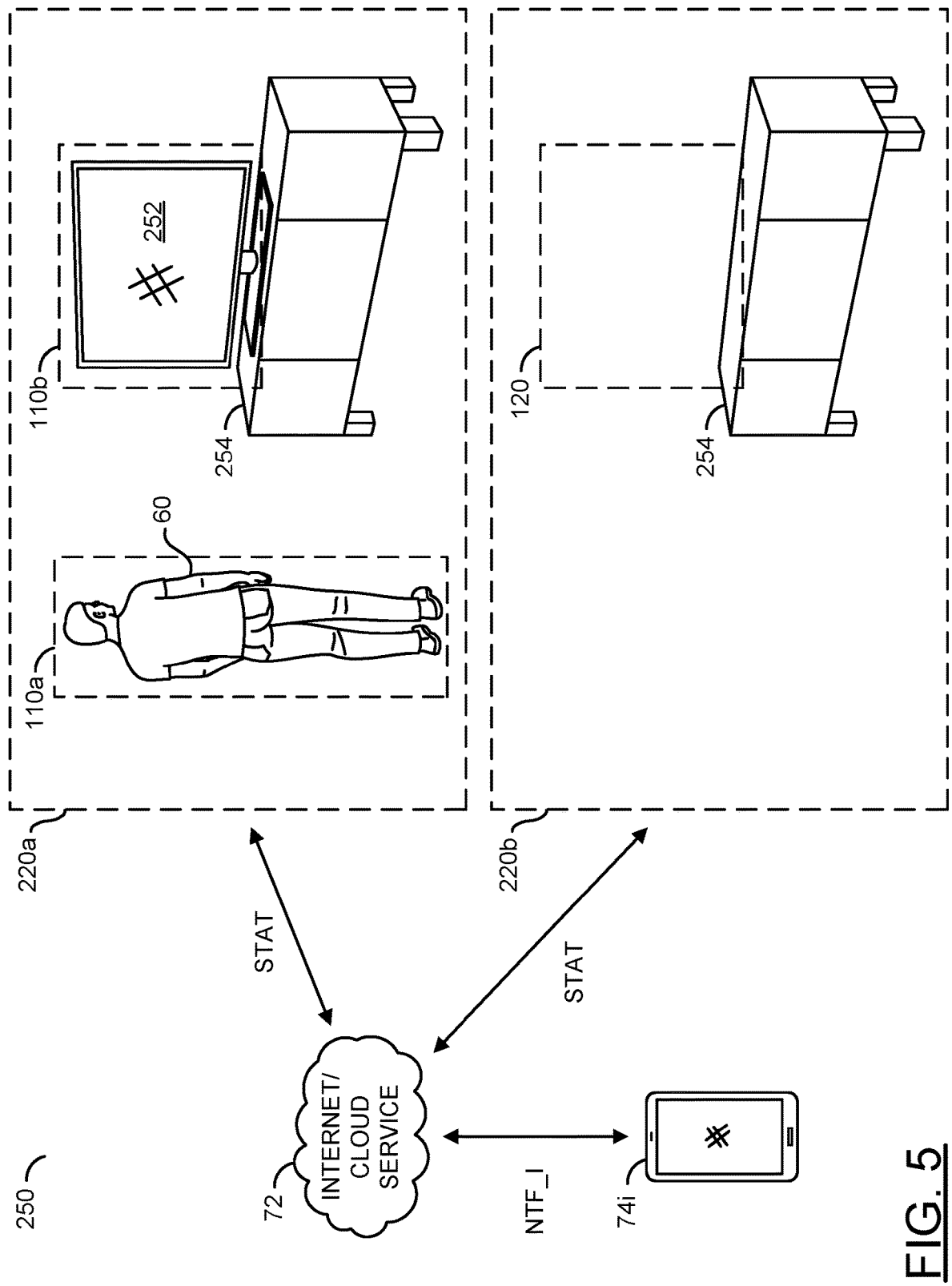
FIG. 5 is a diagram illustrating example video frames in a rental property for detecting item theft.

Referring to FIG. 5, a diagram illustrating example video frames in a rental property for detecting item theft is shown. An example embodiment 250 is shown. The example embodiment 250 may represent an example use case for the camera systems 100a-100n for monitoring items in a rental property. The example scenario 250 may comprise the network 72, the remote device 74i, and/or example video frames 220a-220b.

In some embodiments, in an AirBnB rental (or other rental property) the camera systems 100a-100n may monitor the presence of the renter and/or items in the rental property without compromising privacy. In an example, rental properties often comprise various amenities that renters are expected to use (e.g., soap, shampoo, silverware, televisions, furniture, beds, linens, etc.). Some items may be consumed and/or taken by the renter (e.g., soap and shampoo) while some items stay with the rental property (e.g., television, linens, silverware, etc.). Some items may be of relatively high value (e.g., a television set, a stereo system, etc.) and damage to such items may be a considerable risk to the property owner. The rental agreement 202 may define which items the renter may use, keep, and/or liability for damage to items.

The example video frames 220a-220b may be an example of one type of scenario for monitoring the renters 60a-60n according to the terms/entries of the rental agreement 202 (e.g., monitoring items in or on the rental property 50). The example video frames 220a-220b may each be one of the video frames generated by the processor 156 and/or analyzed by the CV modules 210. In the example shown, the example video frame 220b may be a video frame captured after (e.g., at some later time than) the example video frame 220a. The example video frames 220a-220b may be captured by one of the camera systems 100a-100n but not communicated to the network 72. The extracted data 120 from the video frames 220a-220b (e.g., shown as the signal STAT) may be communicated to the network 72.

In the example video frame 220a, a person (or subject) 60 is shown. The subject 60 may be a person renting the property 50. The dotted box 110a is shown representing the object detection performed by the processor 156. For example, the computer vision operations may detect the object 110a as a person. In some embodiments, the processor 156 may not have feature set data to compare against the detected object 110a (e.g., to preserve privacy, the identity of the person 60 may not be determined).

In the example video frame 220a, a TV 252 is shown on top of a stand 254. The dotted box 110b is shown representing the object detection performed by the processor 156. For example, the computer vision operations may detect the object 110b as the TV 252 located on the stand 254.

In some embodiments, the camera system 100 may be configured to track the location of the detected objects 110a-110n. In some embodiments, the camera system 100 may be configured to track a condition of the detected objects 110a-110n (e.g., search for alternations of a condition of an item such as cracks, dents, missing parts, etc.). The location and/or condition of an item may be the characteristics 112 detected. The location and/or condition 112 of the items in the rental property 50, such as the TV 252 may be an entry in the rental agreement 202. In one example, an entry in the rental agreement 202 may be that the TV 252 should not be moved from the stand 254. In another example, an entry in the rental agreement 202 may be that if the TV 252 is damaged, then the renter may be liable up to a particular amount of money to cover repairs and/or replacement.

The processors 156 may extract the data from the video frame 220a to generate the statistics and parameters 120. The statistics and parameters 120 may be provided to the network 72 as the signal STAT. In some embodiments, the camera system 100 may continuously provide the signal STAT with information about the items at the rental property 50. In some embodiments, the signal STAT may be generated in response to an event being detected (e.g., damage to an item being detected, detecting that an item is missing, etc.).

In the example video frame 220b, the TV 252 is not shown on top of the stand 254. The dotted box 120 is shown representing the parameters and statistics 120 extracted from the video frame 220b by the processor 156. The parameters and statistics 120 may represent the characteristics 112 of the detected object 110b. For example, the computer vision operations may detect the characteristics 112 of the detected object 110b. In the video frame 220a, the characteristics 112 may be that the TV 252 is located in the expected location on the stand 254. In the video frame 220b, the characteristics 112 may be that the TV 252 is missing. For example, the processor 156 may determine that the detected object 110b is missing by comparing the characteristics 112 of the TV 252 from one frame (e.g., not missing in the video frame 220a) to another video frame (e.g., missing in the video frame 220b). In one example, an object that is missing and/or a damaged object may be an event detected by the processor 156 and the processor 156 may communicate the signal STAT to the network 72 in response to the event.

In some embodiments, in response to the event of the missing TV 252, the camera system 100 may generate the signal STAT. In some embodiments, the server 72 may compare the extracted data 120 (e.g., the missing TV 252) to the terms of the rental agreement 202. If the missing TV 252 is a term of the rental agreement 202, then the server 72 may communicate the notification signal NTF_I to the remote device 74i. In some embodiments, the processor 156 may use the machine readable version 206 of the rental agreement 202 to detect the breach. For example, if the TV 252 missing is one of the criteria to detect defined by the machine readable version 206, then the statistics and parameters 120 that correspond to the criteria of the machine readable version 206 may indicate a breach of the rental agreement 202. For example, in response to detecting that the TV 252 is missing, the camera system 100 may communicate the notification signal NTF_I to the remote device 74i.

While the detected object 110a in the video frame 220a may be the person 60, to protect privacy the camera system 100 may not be configured to determine the identity of the person 60. Even if the characteristics 112 of the person 60 detected by the camera system 100 comprises behavior of stealing the TV 252 (e.g., the person 60 is detected as lifting the TV 252 and walking away with the TV 252), the data about the identity of the person 60 may not be available to the camera system 100 to identify the person 60. The statistics and parameters 120 extracted from the video frames 220a-220b may indicate that someone has stolen the TV 252 (as opposed to merely identifying that the TV 252 is missing), but may not provide the identity of the person 60 that stole the TV 252.

The video data may be analyzed to detect whether valuables have disappeared. If valuables have been detected as having disappeared, the notification may indicate that an object has been stolen or broken. In some embodiments, particular types of objects may be detected (e.g., shapes of bottles and/or bottle labels to detect alcohol consumption, kegs, etc.).

Figure 6:
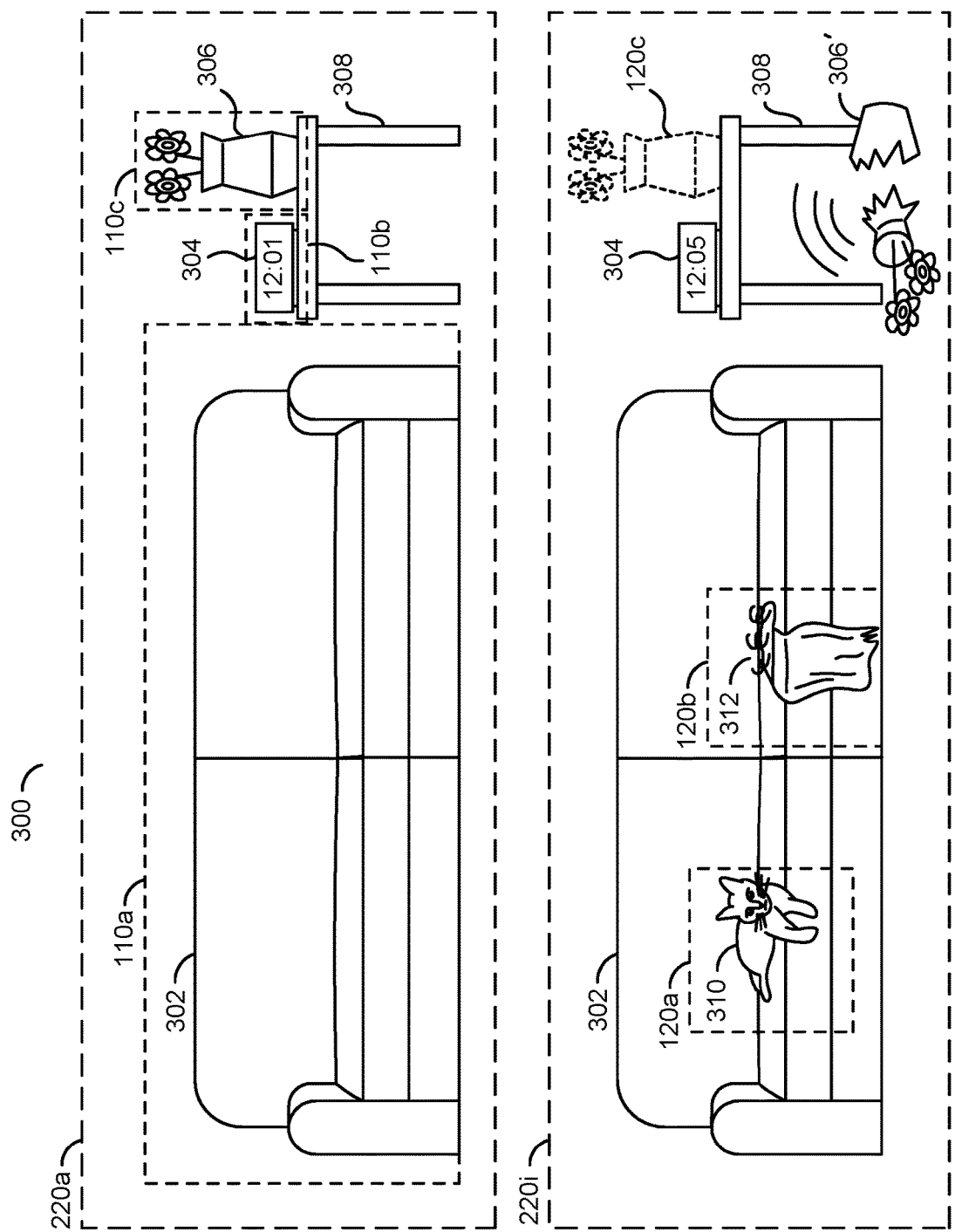
FIG. 6 is a diagram illustrating an example of mapped object locations and pet detection in an example video frame.

Referring to FIG. 6, a diagram illustrating an example of mapped object locations and pet detection in an example video frame is shown. An example scenario 300 is shown. The example scenario 300 may comprise the video frames 220a-220i. In the example scenario 300, the video frame 220i may be captured by the camera system 100 at a later time than the video frame 220a. In the example video frames 220a-220i, the dewarping operations may have already been performed by the processor 156.

The example video frame 220a may comprise an object (or item) 302, an object (or item) 304, an object (or item) 306 and/or an object (or item) 308. The object 302 may be a couch. The object 304 may be a digital clock displaying a time of 12:01. The object 306 may be a vase with flowers. The object 308 may be a table.

The apparatus 100 may be configured to capture the video data and perform the object detection. The apparatus 100 may be configured to generate a map and/or layout of the location 50. The mapping performed by the apparatus 100 may be used to determine the locations (or positions) of objects. For example, many objects in a home are placed in one position and not moved often (e.g., items are placed where they "belong"). Using the information about the locations/positions of objects, the apparatus 100 may be configured to detect items that are out of place.

The dotted box 110a is shown around the couch 302. The dotted box 110b is shown around the clock 304. The dotted box 110c is shown around the vase 306. The dotted box 110a may represent the object detection of the couch 302 by the processor 156. The dotted box 110b may represent the object detection of the clock 304 performed by the processor 156. The dotted box 110b may further represent an expected position of the clock 304. For example, based on detecting the clock 304 on the table 308, the apparatus 100 may determine that the clock 304 belongs on the table 308. The dotted box 110c may represent the object detection of the vase 306 performed by the processor 156. The dotted box 110c may further represent an expected position of the vase 306. For example, based on detecting the vase 306 on the table 308, the apparatus 100 may determine that the vase 306 belongs on the table 308. In some embodiments, the expected position of the objects 302-308 may be defined in the rental agreement 202.

In some embodiments, the apparatus 100 may determine where an object belongs based on detecting the object with respect to a position in the area and/or other nearby objects. In some embodiments, the apparatus 100 may determine where an object belongs based on repeated detections of a particular object in a particular position. Relying on multiple detections may prevent false positives for temporarily placed objects (e.g., a renter may leave a grocery bag near the front door when returning from shopping but the grocery bag may not belong near the front door). The apparatus 100 may also allow for some variation in the position of the object to prevent false positives. For example, the clock 304 may belong on the table 308, but the rental agreement 202 may allow for variations in position of the clock 304 on the table 308 (e.g., the clock 304 is shown to the left of the vase 306, but the apparatus 100 may consider the clock 304 to also belong on the table 308 on the right side of the vase 306).

The machine readable version 206 of the rental agreement 202 may further provide criteria for how far and/or at what times the detected objects 110a-110c may be moved. The machine readable version 206 of the rental agreement 202 may further provide criteria for a condition of the objects 110a-110c. The characteristics 112 determined by the processors 156 may be used to compare the condition of the detected objects 110a-110c to the rental agreement 202 (e.g., to determine whether there has been damage that alters the condition of the detected objects 110a-110c).

The video frame 220i may comprise the couch 302, the clock 304, the vase 306' and/or the table 308. The video frame 220i may be a video frame captured of the same area as shown in the video frame 220a, but at a later time. For example, in the video frame 220i, the clock 304 is showing a time of 12:05, compared to the time 12:01 on the clock 304 in the video frame 220a.

The video frame 220i may further comprise a cat 310 and damage 312. The cat 310 is shown on the couch 302. The damage 312 is shown to the couch 302. The clock 304 is shown on the table 308. The vase 306' is shown as broken on the floor. In the example scenario 300, after the video frame 220a was captured, the vase 306' was knocked over (presumably by the cat 310 that also caused the damage 312). The vase 306' may represent an altered condition caused by damage to the vase 306. For example, by analyzing the video frames 220a-220n captured in between the time when the video frame 220a was captured and the frame 220i was captured, there may be video evidence of the cat 310 jumping on the table 308, swatting the vase 306 to the ground and ripping the couch 302 to cause the damage 312.

The dotted box 120a is shown around the cat 310. The dotted box 120a may represent the data extracted by the processor 156. The dotted box 120b is shown around the damage 312. The dotted box 120b may represent the data extracted by the processor 156. A dotted shape 120c is shown. The dotted shape 120c may correspond with the shape and position of the vase 306 (e.g., from the earlier video frame 220i). The dotted shape 120c may represent the extracted data about the expected (or proper) position of the vase 306. For example, in the video frame 220i, the vase 306 is not in the expected position.

The computer vision modules 210 may be configured to detect pets. The machine readable version 206 of the rental agreement 202 may comprise entries that indicate whether pets are allowed on the property 50, what types of pets are allowed, the number of pets allowed and/or where the pets are allowed. In one example, if the rental agreement 202 does not allow pets, the statistics and parameters 120a may provide an indication of a breach of the rental agreement 202. In another example, if the rental agreement 202 does allow pets, but only dogs are allowed, the statistics and parameters 120a indicating that the cat 310 is at the property 50 may provide an indication of a breach of the rental agreement 202. In yet another example, if the rental agreement 202 does allow cats, but does not allow cats on the couch 302, the statistics and parameters 120a indicating that the cat 310 is on the couch 302 may provide an indication of a breach of the rental agreement 202. In still another example, if the rental agreement 202 does allow up to three pets, then the statistics and parameters 120a may not indicate a breach of the rental agreement 202.

The computer vision modules 120 may be configured to detect a condition of the detected objects 110a-110n. The machine readable version 206 of the rental agreement 202 may comprise entries that indicate how items may be treated by the renter (e.g., whether the item may be used, the condition that the item is expected to be in, where the item may be used, whether the item may be moved, etc.). In an example, if the rental agreement 202 indicates that the couch 302 is not to be used, then the statistics and parameters 120a (e.g., indicating that the cat 310 is on the couch 302) and/or the statistics and parameters 120b (e.g., indicating that there has been the damage 312 to the couch 302) may indicate a breach of the rental agreement 302. In some embodiments, the rental agreement 302 may indicate a potential liability of the renter and the statistics and parameters 120b may provide an indication of how much damage has been done to the couch 302.

The vase 306' is shown broken. The camera system 100 may be configured to detect audio such as broken glass. The landlord may receive the notification NTF in response to the broken glass sound being detected. The rental agreement 202 may indicate that any time particular sounds (e.g., broken glass) have been detected, the landlord may receive a notification. Furthermore, the vase 306 not being in the proper position as indicated by the statistics and parameters 120c and/or the detected condition (e.g., broken) of the vase 306' may indicate a breach of the rental agreement 202.

In the example shown, the statistics and parameters 120a-120b are shown as representative examples. Other detections may be performed by the processor 156 and may be extracted as the statistics and parameters 120a-120n. In one example, the statistics and parameters 120a-120n may be generated in response to detecting a new object (e.g., detecting a brick on the floor that has been thrown through a window, detecting feces on the carpet left by a pet, detecting a stain on the carpet, etc.). The statistics and parameters 120a-120n may comprise information about the detected objects 110a-110n and/or a relationship between the detected objects 110a-110n. In an example, the statistics and parameters 120a-120n may comprise where the detected objects 110a-110n are positioned/located (e.g., absolute coordinates of a video frame), where the detected objects 110a-110n are positioned with respect to each other (e.g., the cat 310 is on top of the couch 302), the status of the detected objects 110a-110n (e.g., the damage 312 to the couch 302, the broken vase 306', the flowers of the vase 306 being dried out, etc.). While the example scenario 300 may provide visual examples, the statistics and parameters 120a-120n may further comprise audio captured by the microphones 160a-160n (e.g., the sound of the vase 306' hitting the floor, an audio level, a type of audio, etc.), etc. The types of detections performed by the apparatus 100 may be varied according to the design criteria of a particular implementation.

Figure 7:
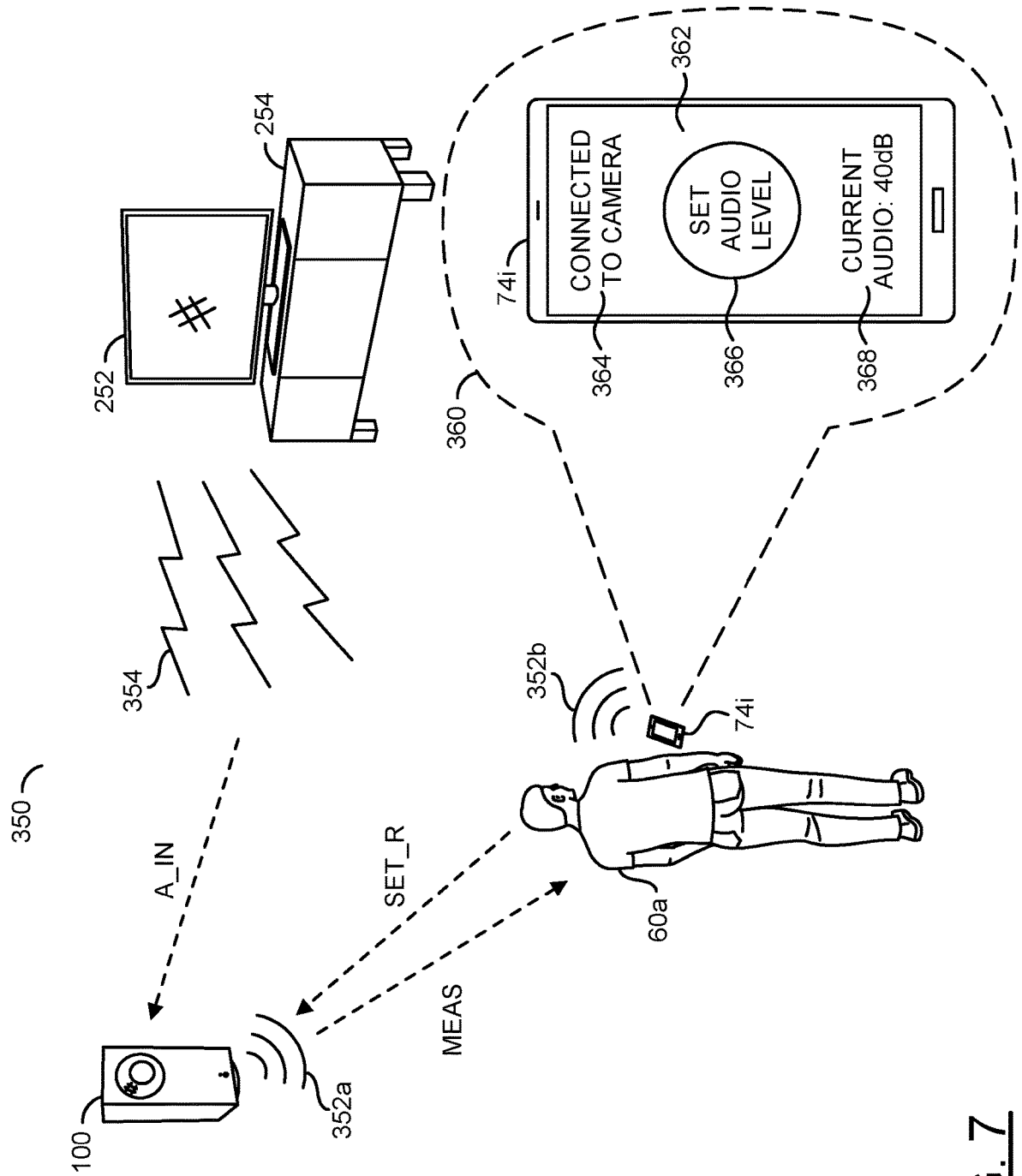
FIG. 7 is a diagram illustrating an example of setting an audio level restriction based on a current room audio level.

Referring to FIG. 7, a diagram illustrating an example of setting an audio level restriction based on a current room audio level is shown. An example scenario 350 is shown. The example scenario 350 may represent the apparatus 100 enabling the property owner to select a sound level for an entry in the rental agreement 202. For example, a property owner may not have the technical knowledge necessary to set the maximum sound/music level for the rental agreement 202. In particular, the property owner may not have an understanding of defining the maximum sound level in terms of decibels (e.g., most people do not know how loud 30 dB or 60 dB actually is). Additionally, a pre-defined decibel limit may not take into account the characteristics of the room in terms of size and acoustic properties.

The example scenario 350 may comprise the person 60a, the remote device 74i (e.g., a smartphone), the apparatus 100 and the TV 252 on the stand 254. The person 60a may be the property owner. In an example, the scenario 350 may generally be a situation that happens before the property owner 60a rents out the location 50. Wireless communication 352a-352b is shown between the smartphone 74i and the apparatus 100. Lines 354 are shown emanating from the TV 252. The lines 354 may represent a loud noise played by the TV 252. A visualization 360 is shown. The visualization 360 may provide a detailed view of the smartphone 74i.

The apparatus 100 may be configured to enable the property owner 60a to run a set-up application on the smartphone 74i to define the maximum allowable sound level. A signal (e.g., SET R) is shown communicated by the smartphone 74i to the apparatus 100. A signal (e.g., MEAS) is shown communicated by the apparatus 100 to the smartphone 74i. A signal (e.g., A_IN) may be one of the signals AIN_A-AIN_N shown in association with FIG. 3 that may be captured by the microphones 160a-160n. For example, the signal A_IN may be the audio 354 generated by the TV 252 that has been captured by the microphones 160a-160n.

In the detailed view 360, the smartphone 74i is shown displaying an app 362. The app 362 may be a companion app for the camera systems 100a-100n. The companion app 362 may be computer readable instructions that may be executed by the smartphones 74a-74n to enable the smartphones 74a-74n to communicate with the camera systems 100a-100n. In an example, the camera systems 100a-100n may provide an application program interface (API) and the companion app 362 may be configured to display output based on converting information from the format of the API to human readable content. The companion app 362 may be configured to translate human input to the format of the API to enable the property owner 60a to provide input to the camera system 100.

In the example shown, the companion app 362 may comprise an indication status 364, a button 366 and a feedback display 368. The indication status 364 may inform the end user 60a whether the companion app 362 is properly communicating with the camera system 100. In the example shown, the indication status 364 may be 'connected to camera'. Other messages for the indication status 364 may comprise 'connecting to camera', 'camera not found', 'microphone on', etc. The button 366 may enable the end user 60a to set the audio level. For example, the signal SET R may be generated in response to the end user 60a pressing the button 366. The feedback display 368 may provide the current audio level recorded by the microphones 160a-160n. The feedback display 368 may provide a real-time indication of the sound level in the room.

The set up application 362 may enable communication with the camera system 100 to enable the microphones 160a-160n to monitor the sound level in the room. For example, the application 362 may generate the signal SET R to instruct the camera system 100 to start monitoring the sound level. The property owner 60a may then play audio at the maximum level that the property owner 60a deems to be acceptable (e.g., play music, turns the television audio 354 up, talks loudly, etc.). The microphones 160a-160n may read the audio input signal A_IN and the processor 156 may determine the audio level captured. The communication device 154 may generate the signal MEAS to provide information for the feedback display 368.

When the property owner 60a decides that the audio in the room is the maximum acceptable level desired, the property owner 60 may press the button 366 on the application 362. The smartphone 74i may communicate the signal SET R to enable the camera system 100 to read and store the current sound level from the microphones 160a-160n. The sound level stored by the camera system 100 may be used as a reference for future comparison when the camera system 100 is in sensing mode (e.g., may be used as part of the machine readable version 206 of the rental agreement 202). For example, the property owner 60a may use the stored audio level as an entry for the audio level in the rental agreement 202.

Figure 8:
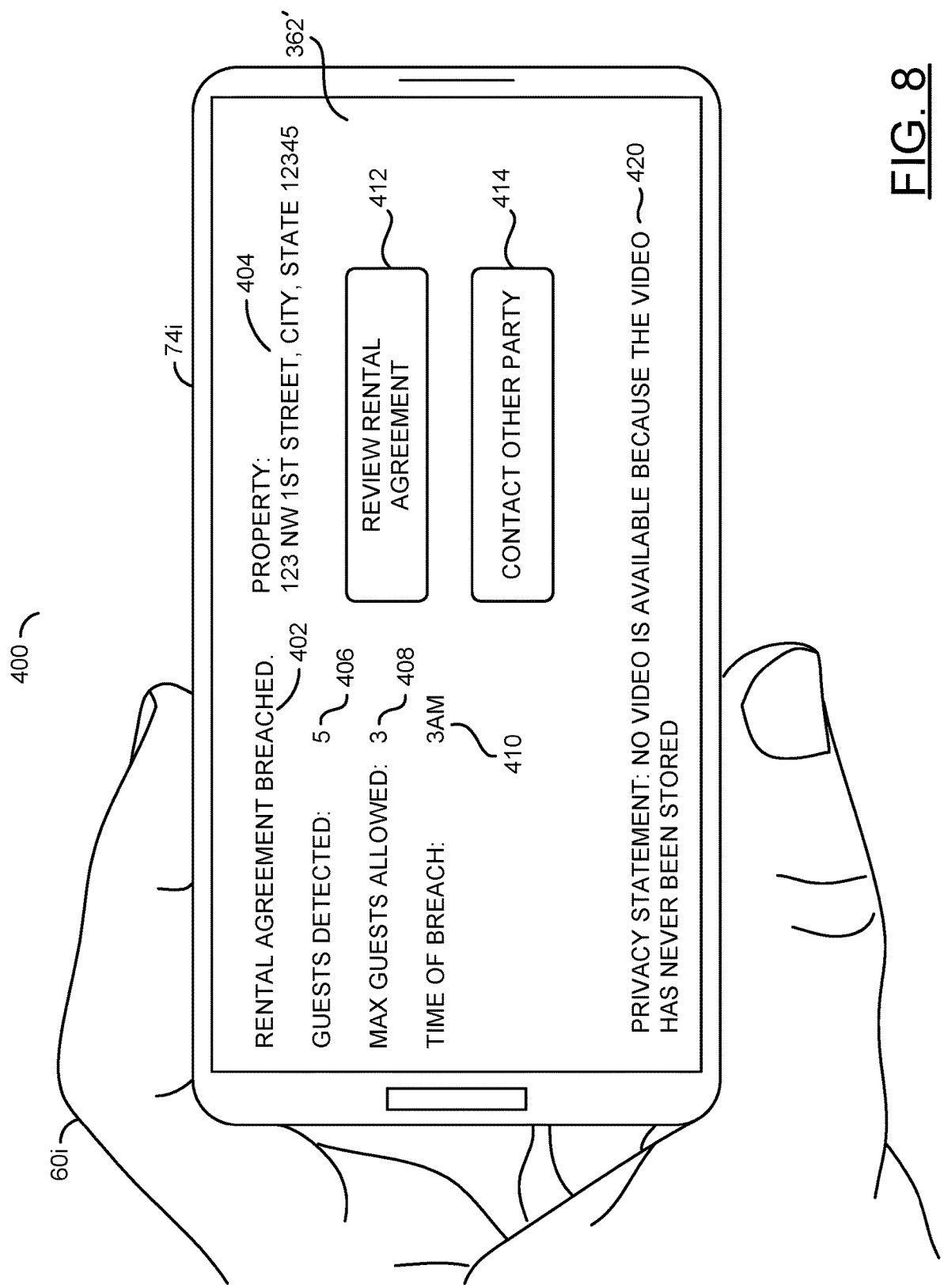
FIG. 8 is a diagram illustrating an example notification for a breach of a rental agreement.

Referring to FIG. 8, a diagram illustrating an example notification for a breach of a rental agreement is shown. An example scenario 400 is shown. The example scenario 400 may comprise a hand 60i holding the smartphone 74i. The hand 60i may be a hand of the renter or a hand of the property owner. The smartphone 74i is shown displaying the companion app 362'. The companion app 362' may be configured to display the notification of a breach of the terms of the rental agreement 202.

The notification shown by the companion app 362' may be generated in response to one of the notification signals NTF_A-NTF_N. In the example shown, the notification may be displayed by the companion app 362'. However, the notification may be communicated by other means. In one example, the notification may be provided by a text message (e.g., SMS). In another example, the notification may be provided by a phone call (e.g., an automated voice message). In yet another example, the notification may be provided via email. The format of the notification may be varied according to the design criteria of a particular implementation.

An example notification is shown displayed on the smartphone 74i. The notification may comprise a message 402. The message 402 may indicate that a breach of the rental agreement 202 has been detected. Additional information about the breach of the rental agreement 202 may be displayed. A property address 404 is shown as part of the notification. The property address 404 may indicate the address of the rental property that corresponds to the detected breach. In an example, the property owner may rent out multiple properties and the property address 404 may provide clarity about which property has the detected breach of the property agreement 202.

In the example shown, the breach to the rental agreement 202 may be the number of guests detected by the camera system 100. The notification may provide details 406-410 about the breach of the rental agreement 202. The details 406-410 may comprise the detection 406, the condition 408 and/or a timestamp 410 of the breach detected based on the statistics and parameters 120a-120n detected by the processor 156.

For the example of a breach detected for the maximum number of allowable guests, the detection 406 may indicate the number of guests detected by the camera system 100. In the example shown (as shown in association with FIG. 1), the number of detected guests 406 may be five. The corresponding condition 408 may be the maximum number of allowed guests according to the rental agreement 202. In the example shown, the maximum number of guests 408 according to the rental agreement 202 may be three. The timestamp 410 may comprise the time that the breach was detected. In the example shown, the detection 406 of five guests may have been detected by the camera system 100 at three in the morning. Other information may be provided based on the extracted data 120a-120n that corresponds to the breach of the rental agreement 202. For example, if a different breach of the agreement 202 was detected (e.g., audio level), the details 406-410 may comprise alternate data types (e.g., maximum sound level of the rental agreement 202, the sound level detected, etc.).

A button 412 and a button 414 are shown as part of the example notification. The button 412 may enable the end user to access the text version 204 of the rental agreement 202. For example, the end user may want to review the terms of the rental agreement 202.

The button 414 may enable the end user to contact the other party in the rental agreement 202. The contact other party button 414 may enable the property owner and the renter to communicate. For example, if the notification is provided to the property owner, then the property owner may contact the renter to inform the renter that the extra guests should leave and if they do not leave then the authorities will be contacted. In another example, if the notification is provided to the renter, then the renter may contact the property owner to inform them that the extra guests have left. The contact other party button 414 may be implemented to enable the parties to remedy the detected breach.

The notification may provide a privacy statement 420. The privacy statement 420 may inform the recipient of the notification that the video (e.g., the video frames 220a-220n) and/or audio (e.g., the signals AIN_A-AIN_N) is not available because the video and/or audio has never been stored. Since the video frames 220a-220n and/or audio captured may be discarded after the processor 156 analyzes the video and/or audio, the video frames 220a-220n and/or the captured audio may be unavailable for communication. The privacy statement 420 may further indicate that the determination of the breach of the rental agreement 202 may be based on the extracted statistics and parameters 120a-120n.

Figure 9:
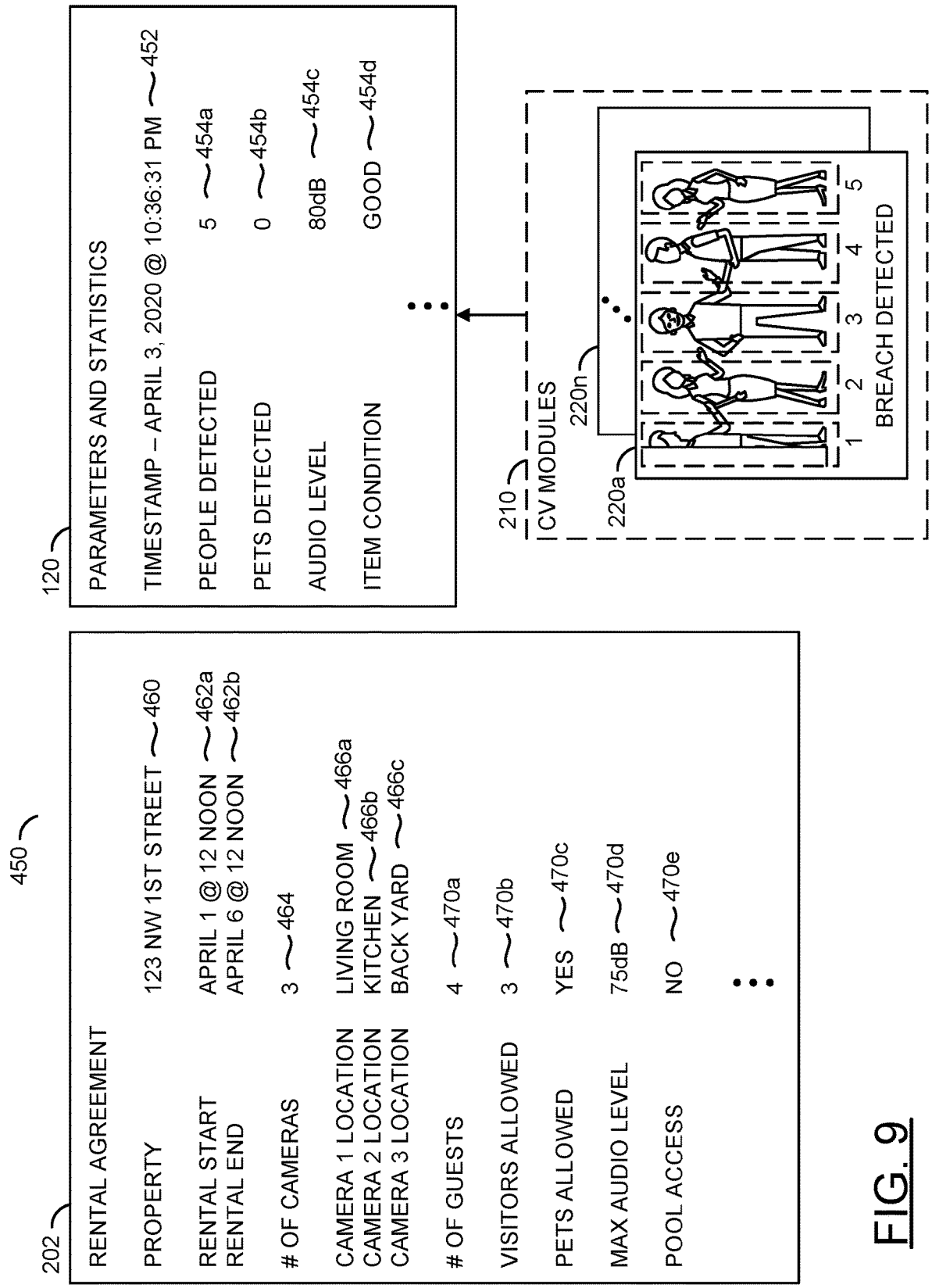
FIG. 9 is a diagram illustrating an example of comparing statistics and parameters extracted from video and/or audio data to entries of a rental agreement.

Referring to FIG. 9, a diagram illustrating an example of comparing statistics and parameters extracted from video and/or audio data to entries of a rental agreement is shown. An example comparison 450 of the rental agreement 202 and the detected parameters and statistics 120 are shown.

The CV modules 210 are shown extracting data from the video frames 220a-220n. The CV modules 210 may extract the data to generate the parameters and statistics 120. As the parameters and statistics 120 are generated from the video frames 220a-220n, the video frames 220a-220n may be discarded. In an example, after the processor 156 extracts the data from the video frame 220a, the video frame 220a may be discarded. One or more of the video frames 220a-220n may be processed in parallel and/or may be operated on at different sections of the video processing pipeline. Once all the parameters and statistics 120 are generated from one video frame, that video frame may be discarded. The other video frames 220a-220n may continue to be passed through the video processing pipeline of the processor 156.

Examples of the parameters and statistics 120 are shown. The parameters and statistics 120 may comprise a timestamp 452. The timestamp 452 may indicate the time that the video frame 220a-220n corresponding to the extracted data 120 was recorded. In an example, the timestamp 452 may be used to generate the time of breach notification 410 shown in association with FIG. 8. In some embodiments, some of the entries of the rental agreement 202 may be time sensitive (e.g., before 10 pm ten guests may be allowed, but after 10 pm only 3 guests may be allowed). The timestamp 452 may provide a temporal reference for when the parameters 120 were extracted.

The parameters 120 may comprise detections 454a-454n. The detections 454a-454n may be the information that may be determined based on the parameters and statistics 120. Generally, the detections 454a-454n may correspond to the entries of the rental agreement 202. For example, in order to protect the privacy of the renters, the amount of data collected may be limited. For example, if the rental agreement 202 does not provide a limitation on the number of guests, then the detections 454a-454n may not comprise information about the number of guests.

The detection 454a may be the number of people detected. In the example shown, the number of people detected may be five. The detection 454b may be the number of pets detected. In the example shown, no pets may be detected. If a pet was detected, further detections 454a-454n may be extracted (e.g., the type of pet, where the pet was kept on the property, etc.). The detection 454c may be the audio level detected. In the example shown, the detected audio level may be 80 dB. The detection 454d may be an item condition. In the example shown, the condition of the item (e.g., the TV 252) may be good (e.g., undamaged, not moved, not used, etc.). The detections 454a-454n may comprise data extracted from both the video frames 220a-220n and the captured audio AIN_A-AIN_N. The detections 454a-454n made by the camera system 100 may be performed in response to the machine readable version 206 of the rental agreement 202. The types of detections extracted in the parameters and statistics 120 may be varied according to the design criteria of a particular implementation.

The rental agreement 202 is shown. For illustrative purposes, the text version 204 of the rental agreement 202 is shown. The rental agreement 202 may comprise a property address 460. In an example, the property address 460 may correspond to the property address 404 shown in association with the notification shown in FIG. 8.

The address 460 may define the location 50. The rental agreement 202 may comprise a time period 462a-462b. The time period 462a-462b may comprise a rental start time 462a and a rental end time 462b. The rental time period 462a-462b may define the time that the rental agreement 202 is active. The rental time period 462a-462b may indicate at which times the camera system 100 may use the feature set defined in the machine readable version 206 of the rental agreement 202. For example, when the current time is outside of the time period 462a-462b, then the camera system 100 may not use the machine readable version 206 of the rental agreement 202 to extract the data from the video frames 220a-220n.

The rental agreement 202 may further define a number of cameras 464 and/or a location of cameras 466a-466c. The number of cameras 464 may indicate how many of the camera systems 100a-100n are implemented at the rental property 50. The location of cameras 466a-466c may define where the camera systems 100a-100n are located. Defining the number of cameras 464 and/or the location of cameras 466a-466c may provide transparency for the renters (e.g., to inform the renters that cameras are detecting behavior and/or watching for breaches to the rental agreement 202). Defining the number of cameras 464 and/or the location of cameras 466a-466c may further ensure that the renters know where the camera systems 100a-100n are located to prevent accidental damage and/or accidentally obscuring the camera systems 100a-100n.

Entries 470a-470e are shown. The entries 470a-470e may define the terms of the rental agreement 202. The entries 470a-470e may define the machine readable instructions 206 to be used by the camera systems 100a-100n. In some embodiments, the entries 470a-470e may be pre-defined types of detections that may be performed by the camera systems 100a-100n. The renter and the property owner may agree on the criteria for the pre-defined types of detections. While five entries 470a-470e are shown in the example 450. Any number of entries 470a-470n may be defined in the rental agreement 202. In some embodiments, the entries 470a-470n available and/or criteria limitations for the entries 470a-470n may be limited by the detection capabilities of the camera systems 100a-100n. The number and/or types of the entries 470a-470n may be varied according to the design criteria of a particular implementation.

The entry 470a may be the number of guests allowed on the rental property 50. In the example shown, the number of guests allowed 470a may be four. The entry 470b may be the number of visitors allowed. In the example shown, the number of guests allowed 470b may be three. For example, the number of guests allowed 470a may define how many people may be allowed at any time, while the number of visitors 470b may define how many additional people may be allowed at particular times (e.g., visitors may be allowed before midnight).

The entry 470c may be whether pets are allowed. In the example shown, the pets entry 470c may be that pets are allowed. The entry 470d may be a maximum audio level. For example, the maximum audio level may be defined as described in association with FIG. 7. In the example shown, the maximum audio level 470d may be 75 dB. The entry 470e may be whether pool access is allowed. In some embodiments, the property owner may not want renters using certain areas of the rental property (e.g., not allowed to use the pool, not allowed in a particular bedroom, etc.). In the example shown, the pool access entry 470e may be that pool access is not allowed.

The processor 156 and/or the server 72 may compare the entries 470a-470n of the rental agreement 202 to the detections 454a-454n extracted from the video data and/or audio data by the camera system 100. The comparison may determine whether there has been a breach of the terms of the rental agreement 202.

In the example shown, the people detected 454a may be five. Comparing to the number of guests entry 470a (e.g., four), more than four guests have been detected. However, the timestamp 452 may be before midnight. Since the visitor entry 470b provides for three guests before midnight, then the people detected 454a may not breach the rental agreement 202.

In the example shown, the pets detected 454b may be zero. Since the pets entry 470c of the rental agreement 202 allows for pets, the pets detected 454b may not breach the rental agreement. The detected audio level 454c may be 80 dB. Since the maximum audio level entry 470d may be 75 dB, the audio level detected 454c may breach the terms of the rental agreement. The server 72 and/or the camera system 100 may generate the signal NTF to provide a notification to the renter and/or the property owner that the maximum audio level entry 470d of the rental agreement 202 has been breached.

Figure 10:
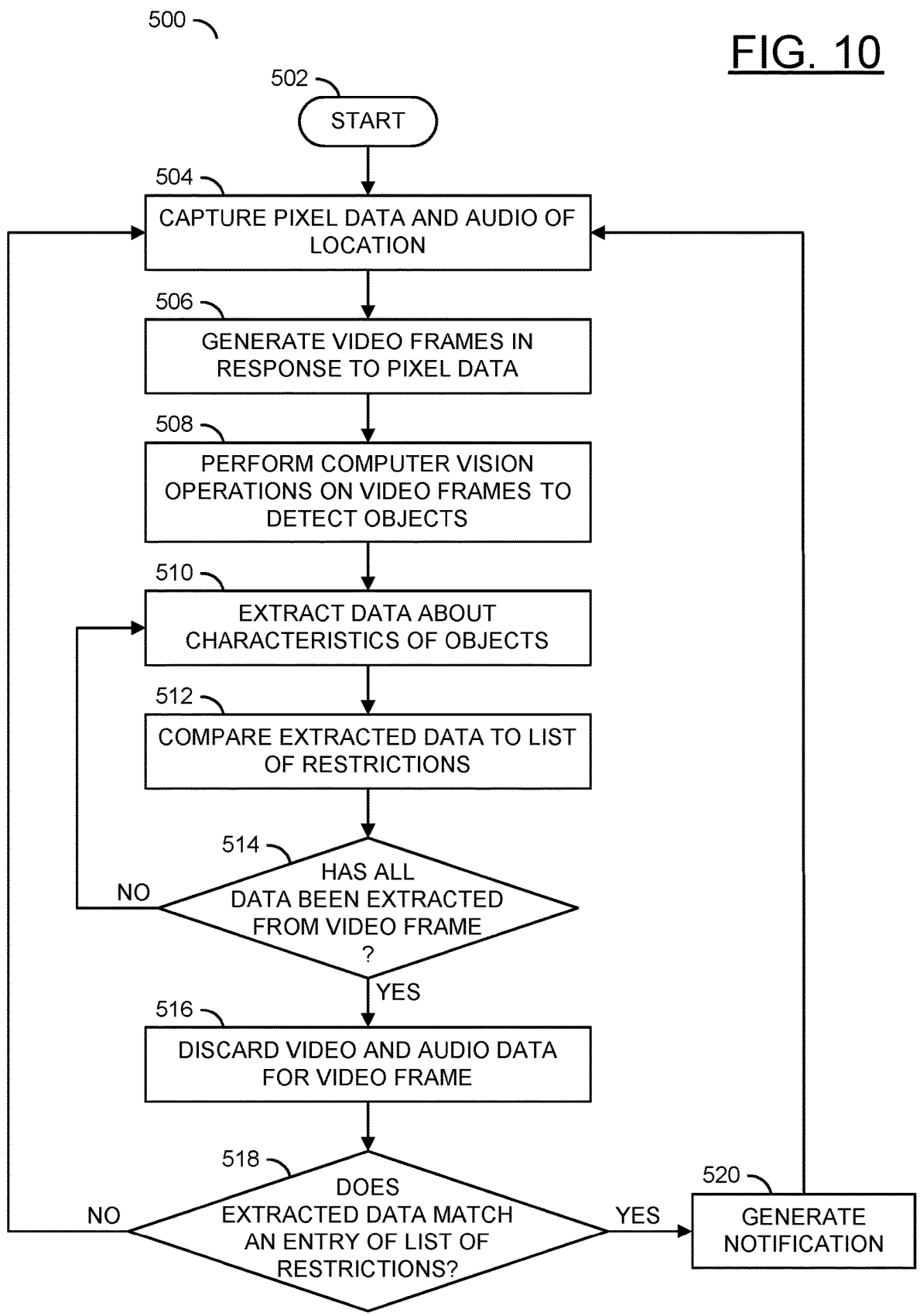
Referring to FIG. 10, a flow diagram illustrating a method for detecting a breach of a rental agreement based on video and audio data while respecting privacy is shown.

Referring to FIG. 10, a method (or process) 500 is shown. The method 500 may detect a breach of a rental agreement based on video and audio data while respecting privacy. The method 500 generally comprises a step (or state) 502, a step (or state) 504, a step (or state) 506, a step (or state) 508, a step (or state) 510, a step (or state) 512, a decision step (or state) 514, a step (or state) 516, a decision step (or state) 518, and a step (or state) 520.

The step 502 may start the method 500. In the step 504, one or more of the capture devices 152a-152n may capture the pixel data PIXELD_A-PIXELD_N and the microphones 160a-160n may capture the audio data DIR_AUD at the location 50. Next, in the step 506, the processor 156 may generate the video frames 220a-220n in response to the pixel data. In the step 508, the computer vision modules 210 may perform the computer vision operation on the video frames 220a-220n to detect the objects 110a-110n. Next, the method 500 may move to the step 510.

In the step 510, the computer vision modules 210 may extract the data (e.g., the parameters and settings 120a-120n) about the characteristics 112a-112n of the detected objects 110a-110n. Next, in the step 512, the processor 156 may compare the extracted data 120a-120n to the entries 470a-470n of the rental agreement 202. Next, the method 500 may move to the decision step 514.

In the decision step 514, the processor 156 may determine whether all the data has been extracted from one of the video frames 220a-220n. In an example, all the data may be extracted from one of the video frames 220a-220n when one of the video frames 220a-220n passes through the video processing pipeline of the processor 156. In another example, all the data may be extracted from one of the video frames 220a-220n when one of the video frames 220a-220n has been analyzed based on the feature sets corresponding to all of the entries 470a-470n of the rental agreement 202. If all of the data has not been extracted, then the method 500 may return to the step 510. If all of the data has been extracted, then the method 500 may move to the step 516. In the step 516, the processor 156 may discard the video and audio corresponding to the video frame. Next, the method 500 may move to the decision step 518.

In the decision step 518, the processor 156 may determine whether the extracted data 120a-120n matches (or exceeds a threshold) of at least one of the entries 470a-470n on the list of restrictions 202. In one example, the threshold may be a number of people. In another example, the threshold may be an audio level. In yet another example, the threshold may be the presence of a pet. If the extracted data 120a-120n does not match any of the entries 470a-470n, then the method 500 may return to the step 504. If the extracted data 120a-120n matches at least one of the entries 470a-470n, then the method 500 may move to the step 520. In the step 520, the camera system 100 may generate the notification. For example, the communication device 154 may communicate the signal STAT to the server 72 and/or generate the signal NTF to one or more of the remote devices 74a-74n. Next, the method 500 may return to the step 504.

Figure 11:
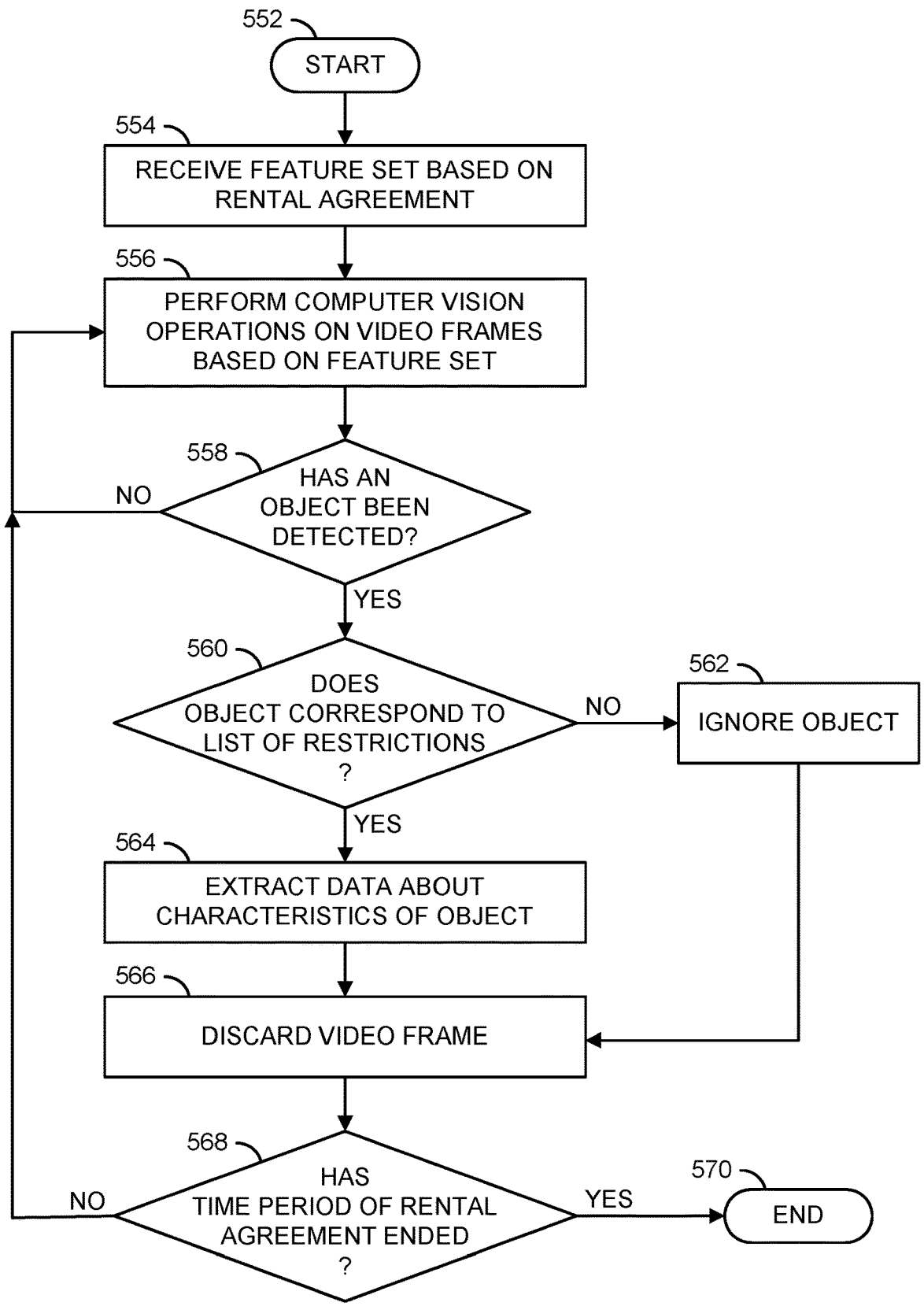
Referring to FIG. 11, a flow diagram illustrating a method for performing computer vision operations based on a feature set corresponding to a rental agreement is shown.

Referring to FIG. 11, a method (or process) 550 is shown. The method 550 may perform computer vision operations based on a feature set corresponding to a rental agreement. The method 550 generally comprises a step (or state) 552, a step (or state) 554, a step (or state) 556, a decision step (or state) 558, a decision step (or state) 560, a step (or state) 562, a step (or state) 564, a step (or state) 566, a decision step (or state) 568, and a step (or state) 570.

The step 552 may start the method 550. In the step 554, the camera system 100 may receive the signal FEAT_SET based on the rental agreement 202. In an example, the signal FEAT_SET may be based on the machine readable version 206 of the rental agreement 202. Next, in the step 556, the camera system 100 may perform the computer vision operations on the video frames 220a-220n generated. The computer vision operations (and the audio analysis) may be performed based on the feature set. Next, the method 550 may move to the decision step 558.

In the decision step 558, the processor 156 may determine whether there has been an object detection 110a-110n. If there has not been an object detection, then the method 550 may return to the step 556. If there has been an object detection, then the method 550 may move to the decision step 558.

In the decision step 558, the processor 156 may determine whether the detected objects 110a-110n correspond to any of the entries 470a-470n of the rental agreement 202. In an example, if one of the entries 470a-470n comprises a maximum number of people then a person may be an object that corresponds to the list of restrictions. In another example, if one of the entries 470a-470n comprises a maximum audio level, then the audio level may correspond to the list of restrictions. If the object does not correspond to the entries 470a-470n of the list of restrictions 202, then the method 550 may move to the step 562. In the step 562, the processor 156 may ignore the detected object. The processor 156 may ignore the detected object by not extracting data corresponding to the characteristics 112 of the detected objects 110a-110n. For example, if pets are not restricted by the rental agreement 202, then the processor 156 may not extract any data about the pets detected. Next, the method 550 may move to the step 566.

In the decision step 560, if the object does correspond to the entries 470a-470n, then the method 550 may move to the step 564. In the step 564, the processor 156 may extract the data 120a-120n about the characteristics 112 of the detected objects 110a-110n. Next, in the step 566, the processor 156 may discard the video frames 220a-220n. Next, the method 550 may move to the decision step 568.

In the decision step 568, the processor 156 may determine whether the time period 462a-462b of the rental agreement 202 has ended (e.g., if the rental agreement 202 has expired). If the rental agreement 202 has not ended, then the method 550 may return to the step 556. If the rental agreement 202 has ended, then the method 550 may move to the step 570. The step 570 may end the method 550.

Figure 12:
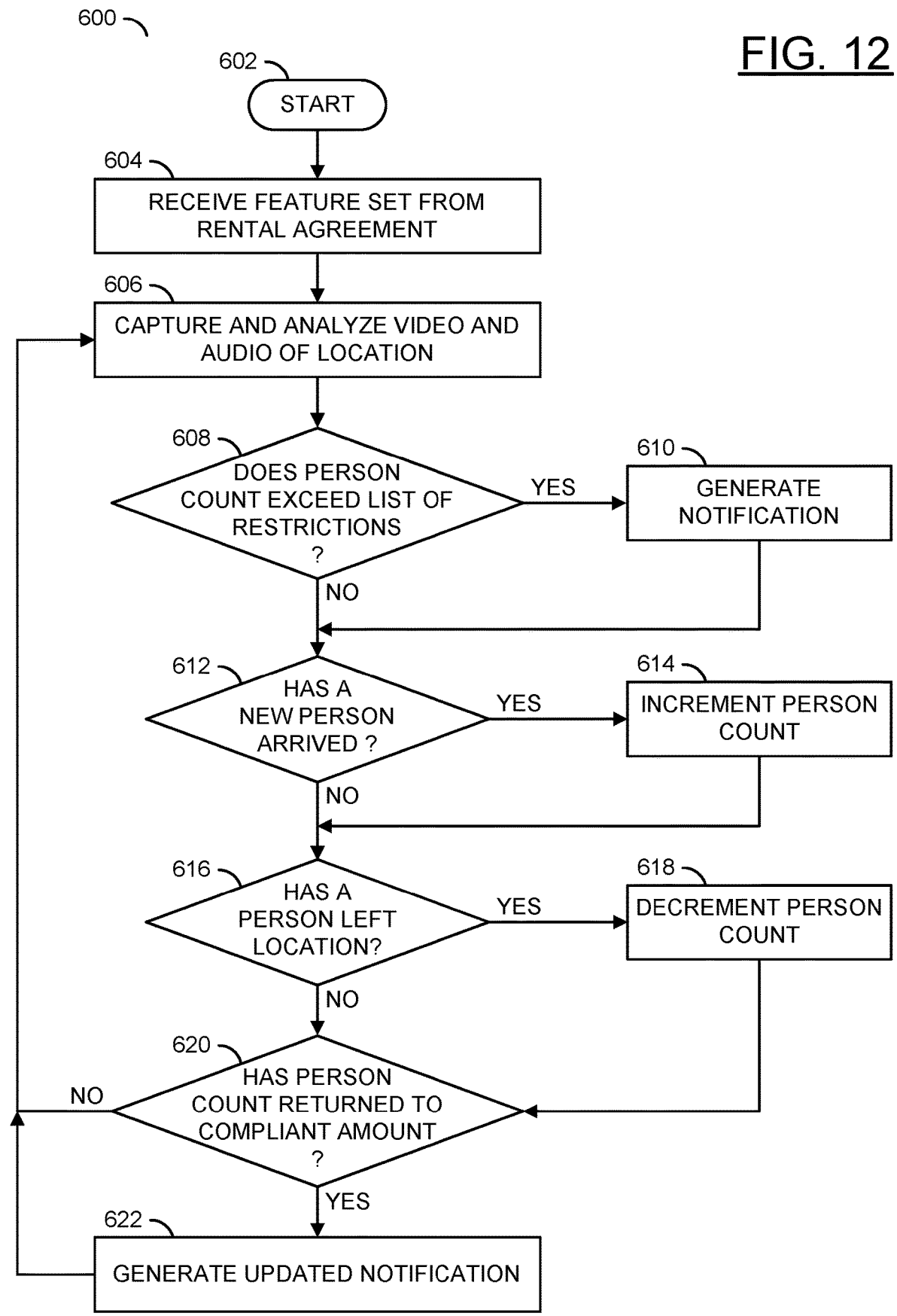
Referring to FIG. 12, a flow diagram illustrating a method for determining a breach of a restriction of a rental agreement based on a person count is shown.

Referring to FIG. 12, a method (or process) 600 is shown. The method 600 may determine a breach of a restriction of a rental agreement based on a person count. The method 600 generally comprises a step (or state) 602, a step (or state) 604, a step (or state) 606, a decision step (or state) 608, a step (or state) 610, a decision step (or state) 612, a step (or state) 614, a decision step (or state) 616, a step (or state) 618, a decision step (or state) 620, and a step (or state) 622.

The step 602 may start the method 600. In the step 604, the camera system 100 may receive the feature set information from the rental agreement. In an example, the server 72 may provide the signal FEAT_SET to the camera system 100. The signal FEAT_SET may comprise the machine readable version 206 of the rental agreement 202. Next, in the step 606, the camera system 100 may capture and analyze the video and audio captured of the location 50. Next, the method 600 may move to the decision step 608.

In the decision step 608, the processor 156 may determine whether the extracted data 120a-120n corresponding to the number of people 60a-60n at the location 50 exceeds the values of the entries 470a-470n of the list of restrictions 202. If the number of people exceeds the list of restrictions 202, then the method 600 may move to the step 610. In the step 610, the camera system 100 may generate the notification (e.g., one of the signals NTF_A-NTF_N and/or one of the signals STAT_A-STAT_N that indicates that there has been a breach of the terms of the rental agreement 202). Next, the method 600 may move to the decision step 612. In the decision step 608, if the number of people does not exceed the list of restrictions 202, then the method 600 may move to the decision step 612.

In the decision step 612, the processor 156 may determine whether a new person has arrived at the location 50. In an example, the processor 156 may analyze the extracted data 120a-120n to determine if a person 60a-60n that has not already been counted has entered the location 50. If a new person has been detected, then the method 600 may move to the step 614. In the step 614, the processor 156 may increment a person count for the location 50. The person count may track the number of people currently at the location 50. Next, the method 600 may move to the decision step 616. In the decision step 612, if no new person has been detected at the location 50, then the method 600 may move to the decision step 616.

In the decision step 616, the processor 156 may determine whether a person has left the location 50. In an example, the processor 156 may analyze the extracted data 120a-120n to determine if one of the people 60a-60n that has already been counted has left the location 50. For example, the camera system 100 may be set up to capture video of an entrance/exit of the location 50 to count people as they enter/leave the location 50. If a person is detected leaving the location 50, then the method 600 may move to the step 618. In the step 618, the processor 156 may decrement a person count for the location 50. Next, the method 600 may move to the decision step 620. In the decision step 616, if no person has been detected leaving the location 50, then the method 600 may move to the decision step 620.

In the decision step 620, the processor 156 may determine whether the person count for the location 50 has returned to a compliant amount (e.g., an amount that does not exceed the number of people listed as one of the entries 470a-470n). If the person count has not returned to the compliant amount, then the method 600 may return to the step 606. For example, notifications may continue to be generated at particular time intervals as long as the renter is not compliant with the terms of the rental agreement 202 (e.g., a notification may be sent every half hour). If the person count was not out of compliance with the rental agreement 202, then the decision step 620 may be skipped and the method 600 may return to the step 606. In the decision step 620, if the person count has returned to the compliant amount, then the method 600 may move to the step 622. In the step 622, the camera system 100 may generate an updated notification. For example, the updated notification may provide a message that indicates that the renter is now in compliance with the rental agreement 202 (e.g., the breach of the rental agreement 202 has been cured). Next, the method 600 may return to the step 606.

Figure 13:
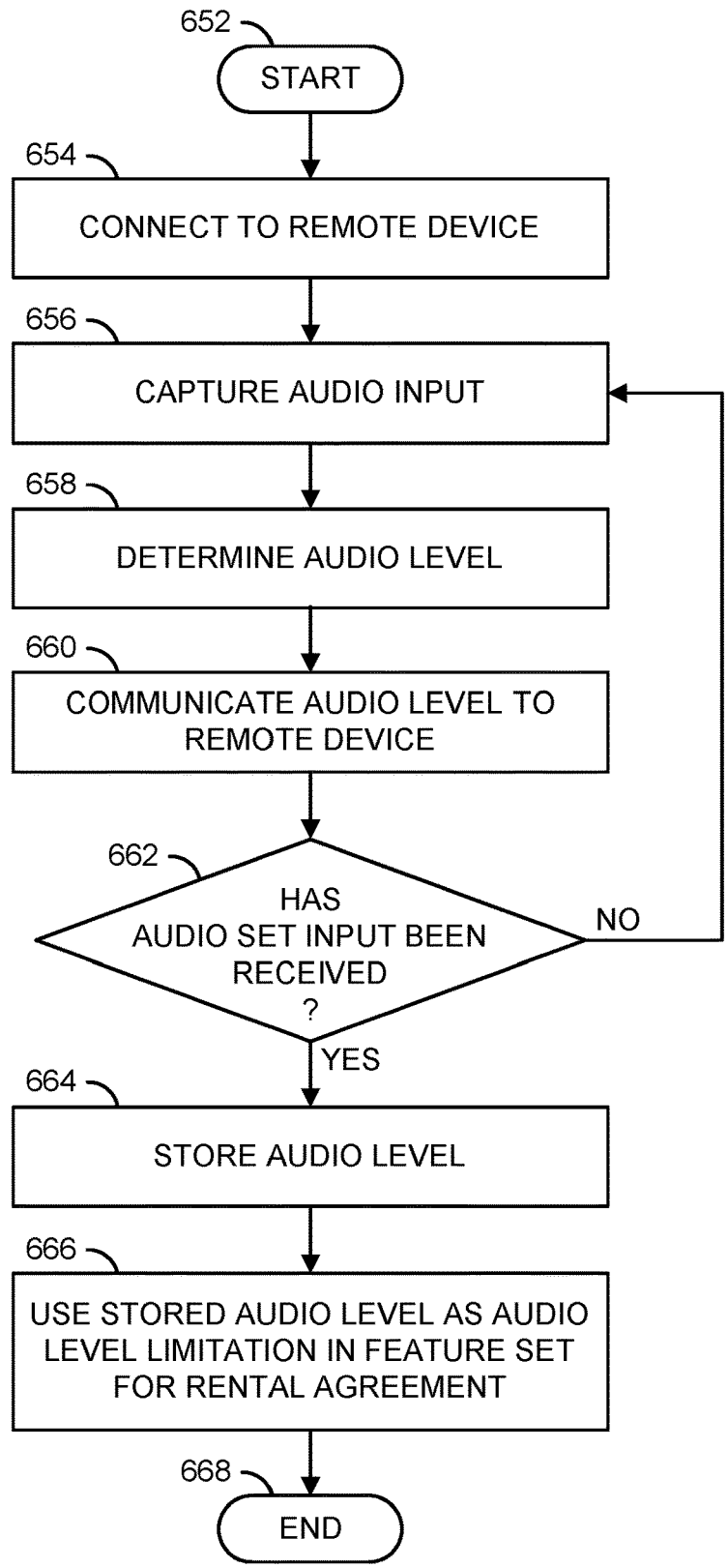
Referring to FIG. 13, a flow diagram illustrating a method for setting an audio level is shown.

Referring to FIG. 13, a method (or process) 650 is shown. The method 650 may set an audio level. The method 650 generally comprises a step (or state) 652, a step (or state) 654, a step (or state) 656, a step (or state) 658, a step (or state) 660, a decision step (or state) 662, a step (or state) 664, a step (or state) 666, and a step (or state) 668.

The step 652 may start the method 650. In the step 654, the camera system 100 may connect to one of the remote devices 74a-74n. In an example, the owner of the rental property may connect a smartphone to the camera system 100 using the companion app 362 before renting out the location 50 and/or before defining the entries 470a-470n of the rental agreement 202. Next, in the step 656, the microphones 160a-160n of the camera system 100 may capture the input audio AIN_A-AIN_N at the location 50. In the step 658, the processor 156 may determine the current audio level (e.g., a current value of audio) detected by the microphones 160a-160n (e.g., a measurement in decibels). Next, in the step 660, the camera system 100 may communicate the signal MEAS to one of the remote devices 74a-74n. The signal MEAS may provide the audio level reading to the companion app 362 to provide the current audio reading 368. Next, the method 650 may move to the decision step 662.

In the decision step 662, the processor 156 may determine whether an audio set input has been received. In an example, the processor 156 may monitor whether the communication device 154 has received the signal SET R from one of the remote devices 74a-74n. If the processor 156 has not detected the signal SET R, then the method 650 may return to the step 656 to continue monitoring the audio level at the location 50. If the processor 156 has detected the signal SET R, then the method 650 may move to the step 664. In the step 664, the camera system 100 may store the currently detected audio level in the memory 158. Next, in the step 666, the stored audio level in the memory 158 may be used as one of the entries 470a-470n in the rental agreement 202. The audio level reading may be part of the feature set provided in the machine readable version 206 of the rental agreement 202. For example, the entries 470a-470n of the rental agreement 202 may be adjustable in response to user input (e.g., the signal SET R) received from a remote device such as the smartphones 74a-74n. Next, the method 650 may move to the step 668. The step 668 may end the method 650.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a capture device configured to generate pixel data of a location; and
a processor configured to (i) process said pixel data arranged as video frames, (ii) perform video operations to detect objects in said video frames, (iii) extract data about said objects based on characteristics of said objects determined using said video operations, (iv) compare said data to a list of restrictions for said location, (v) generate a notification in response to said data matching an entry of said list of restrictions, and (vi) send said notification externally from said processor, wherein
(a) said video frames are discarded after performing said video operations and before said matching to said entry of said list of restrictions for said location, and
(b) said video operations, extracting said data about said objects and said comparison to said entry of said list of restrictions for said location are performed internal to said apparatus on said processor.

2. The apparatus according to claim 1, further comprising an audio capture device configured to capture audio of said location.

3. The apparatus according to claim 2, wherein said processor is further configured to (i) analyze said audio, (ii) compare said audio to said list of restrictions for said location, and (iii) generate said notification in response to said audio matching said entry of said list of restrictions.

4. The apparatus according to claim 3, wherein said entry of said list of restrictions comprises an audio amplitude limitation.

5. The apparatus according to claim 3, wherein said entry of said list of restrictions is adjustable in response to a user input from a remote device.

6. The apparatus according to claim 5, wherein said remote device is a smartphone.

7. The apparatus according to claim 5, wherein (i) said remote device communicates with said apparatus, (ii) said remote device enables a user to set a value for said entry of said list of restrictions, (iii) said audio capture device detects a current value of said audio and (iv) said value for said entry is set as said current value of said audio.

8. The apparatus according to claim 1, wherein (i) said entry of said list of restrictions comprises a limitation of a number of people allowed at said location and (ii) said video operations comprise detecting a number of people at said location.

9. The apparatus according to claim 1, wherein (i) said entry of said list of restrictions comprises an animal and (ii) said video operations comprise detecting said animal.

10. The apparatus according to claim 1, wherein (i) said location is a rental property and (ii) said list of restrictions is part of a rental agreement.

11. The apparatus according to claim 1, wherein (i) said objects comprise items in said location, (ii) said data comprises a position of said items and (iii) said list of restrictions comprises moving said items from said position.

12. The apparatus according to claim 1, wherein (i) said objects comprise items in said location, (ii) said data comprises a condition of said items and (iii) said list of restrictions comprises causing damage that alters said condition of said items.

13. The apparatus according to claim 1, wherein (i) said data comprises parameters and statistics determined from analyzing said video frames and (ii) said parameters and statistics are readable by said processor.

14. The apparatus according to claim 1, wherein said notification is communicated external to said apparatus to a remote device to indicate a breach of said list of restrictions.

15. The apparatus according to claim 14, wherein said video frames are unavailable to be communicated with said notification.

16. The apparatus according to claim 1, wherein said processor comprises a scheduler circuit configured to (i) store a directed acyclic graph, (ii) parse said directed acyclic graph into a plurality of operators and (iii) schedule said plurality of operators in one or more of a plurality of hardware engines of said processor based on when said plurality of operators are ready to be processed by said plurality of hardware engines.

17. The apparatus according to claim 16, wherein (i) said apparatus is configured to receive a feature set based on said list of restrictions, (ii) said processor is configured to generate said directed acyclic graph in response to said feature set and (iii) said directed acyclic graph defines said video operations to enable said processor to extract said data.

18. The apparatus according to claim 1, wherein said video operations comprise performing computer vision operations using a convolutional neural network to implement object recognition through multiple layers of feature detection.

19. The apparatus according to claim 18, wherein (i) said convolutional neural network is configured to calculate descriptors based on said feature detection and (ii) said descriptors enable said processor to determine a likelihood that pixels of said video frames correspond to a particular one of said objects.

20. The apparatus according to claim 18, wherein said object recognition implemented by said convolutional neural network comprises (i) sliding a feature detection window along groups of pixels associated with said layers of said video frames, (ii) performing a convolutional operation on said groups of pixels in a current region covered by said feature detection window and (iii) generating a result for each of a plurality of regions to generate said extracted data.

* * * * *